(12) United States Patent
Petriovic et al.

(10) Patent No.: US 8,681,978 B2
(45) Date of Patent: Mar. 25, 2014

(54) EFFICIENT AND SECURE FORENSIC MARKING IN COMPRESSED DOMAIN

(71) Applicant: Verance Corporation, San Diego, CA (US)

(72) Inventors: Rade Petriovic, San Diego, CA (US); Dai Yang, San Diego, CA (US)

(73) Assignee: Verance Corporation, San Diego, CA (US)

( * ) Notice: Subject to any disclaimer, the term of this patent is extended or adjusted under 35 U.S.C. 154(b) by 0 days.

(21) Appl. No.: 13/717,449

(22) Filed: Dec. 17, 2012

(65) Prior Publication Data

US 2013/0108101 A1 May 2, 2013

Related U.S. Application Data

(63) Continuation of application No. 13/567,792, filed on Aug. 6, 2012, now Pat. No. 8,346,567, which is a continuation of application No. 12/488,397, filed on Jun. 19, 2009, now Pat. No. 8,259,938.

(60) Provisional application No. 61/075,289, filed on Jun. 24, 2008.

(51) Int. Cl.
*G10L 19/018* (2013.01)

(52) U.S. Cl.
USPC ............ 380/203; 704/200; 704/500; 713/176

(58) Field of Classification Search
USPC ..................... 704/200, 500; 380/203; 713/176
See application file for complete search history.

(56) References Cited

U.S. PATENT DOCUMENTS

| | | | |
|---|---|---|---|
| 3,406,344 A | 10/1968 | Hopper | |
| 3,842,196 A | 10/1974 | Loughlin | |
| 3,885,217 A | 5/1975 | Cintron | |
| 3,894,190 A | 7/1975 | Gassmann | |
| 3,919,479 A | 11/1975 | Moon et al. | |

(Continued)

FOREIGN PATENT DOCUMENTS

| CA | 2276638 A1 | 1/2000 |
|---|---|---|
| EP | 282734 A1 | 9/1988 |

(Continued)

OTHER PUBLICATIONS

Zhao, J., "Applying digital watermarking techniques to online multimedia commerce," Proc. Int. Conf. on Imaging Science, Systems and Applications (CISSA'97), Jun./Jul. 1997 (7 pages).

(Continued)

*Primary Examiner* — Daniel D Abebe
(74) *Attorney, Agent, or Firm* — Perkins Coie LLP; Donald L. Wenskay

(57) ABSTRACT

Methods, devices, and computer program products enable the embedding of forensic marks in a host content that is in compressed domain. These and other features are achieved by preprocessing of a host content to provide a plurality of host content versions with different embedded watermarks that are subsequently compressed. A host content may then be efficiently marked with forensic marks in response to a request for such content. The marking process is conducted in compressed domain, thus reducing the computational burden of decompressing and re-compressing the content, and avoiding further perceptual degradation of the host content. In addition, methods, devices and computer program products are disclosed that obstruct differential analysis of such forensically marked content.

37 Claims, 8 Drawing Sheets

(56) References Cited

U.S. PATENT DOCUMENTS

| | | |
|---|---|---|
| 3,973,206 A | 8/1976 | Haselwood et al. |
| 4,048,562 A | 9/1977 | Haselwood et al. |
| 4,176,379 A | 11/1979 | Wessler et al. |
| 4,199,788 A | 4/1980 | Tsujimura |
| 4,225,967 A | 9/1980 | Miwa et al. |
| 4,230,990 A | 10/1980 | Lert, Jr. et al. |
| 4,281,217 A | 7/1981 | Dolby |
| 4,295,128 A | 10/1981 | Hashemian et al. |
| 4,425,578 A | 1/1984 | Haselwood et al. |
| 4,454,610 A | 6/1984 | Sziklai |
| 4,464,656 A | 8/1984 | Nakamura |
| 4,497,060 A | 1/1985 | Yang |
| 4,512,013 A | 4/1985 | Nash et al. |
| 4,547,804 A | 10/1985 | Greenberg |
| 4,564,862 A | 1/1986 | Cohen |
| 4,593,904 A | 6/1986 | Graves |
| 4,639,779 A | 1/1987 | Greenberg |
| 4,669,089 A | 5/1987 | Gahagan et al. |
| 4,677,466 A | 6/1987 | Lert, Jr. et al. |
| 4,686,707 A | 8/1987 | Iwasaki et al. |
| 4,703,476 A | 10/1987 | Howard |
| 4,706,282 A | 11/1987 | Knowd |
| 4,723,302 A | 2/1988 | Fulmer et al. |
| 4,729,398 A | 3/1988 | Benson et al. |
| 4,739,398 A | 4/1988 | Thomas et al. |
| 4,750,173 A | 6/1988 | Bluthgen |
| 4,755,871 A | 7/1988 | Morales-Garza et al. |
| 4,755,884 A | 7/1988 | Efron et al. |
| 4,764,608 A | 8/1988 | Masuzawa et al. |
| 4,764,808 A | 8/1988 | Solar |
| 4,789,863 A | 12/1988 | Bush |
| 4,805,020 A | 2/1989 | Greenberg |
| 4,807,013 A | 2/1989 | Manocha |
| 4,807,031 A | 2/1989 | Broughton et al. |
| 4,840,602 A | 6/1989 | Rose |
| 4,843,562 A | 6/1989 | Kenyon et al. |
| 4,876,617 A | 10/1989 | Best et al. |
| 4,876,736 A | 10/1989 | Kiewit |
| 4,930,011 A | 5/1990 | Kiewit |
| 4,931,871 A | 6/1990 | Kramer |
| 4,937,807 A | 6/1990 | Weitz et al. |
| 4,939,515 A | 7/1990 | Adelson |
| 4,943,963 A | 7/1990 | Waechter et al. |
| 4,945,412 A | 7/1990 | Kramer |
| 4,967,273 A | 10/1990 | Greenberg |
| 4,969,041 A | 11/1990 | O'Grady et al. |
| 4,972,471 A | 11/1990 | Gross et al. |
| 4,972,503 A | 11/1990 | Zurlinden |
| 4,979,210 A | 12/1990 | Nagata et al. |
| 5,057,915 A | 10/1991 | Von Kohorn |
| 5,073,925 A | 12/1991 | Nagata et al. |
| 5,080,479 A | 1/1992 | Rosenberg |
| 5,113,437 A | 5/1992 | Best et al. |
| 5,116,437 A | 5/1992 | Yamamoto et al. |
| 5,161,251 A | 11/1992 | Mankovitz |
| 5,191,615 A | 3/1993 | Aldava et al. |
| 5,200,822 A | 4/1993 | Bronfin et al. |
| 5,210,820 A | 5/1993 | Kenyon |
| 5,210,831 A | 5/1993 | Emma et al. |
| 5,213,337 A | 5/1993 | Sherman |
| 5,214,792 A | 5/1993 | Alwadish |
| 5,237,611 A | 8/1993 | Rasmussen et al. |
| 5,251,041 A | 10/1993 | Young et al. |
| 5,270,480 A | 12/1993 | Hikawa |
| 5,294,962 A | 3/1994 | Sato et al. |
| 5,294,982 A | 3/1994 | Salomon et al. |
| 5,319,453 A | 6/1994 | Copriviza et al. |
| 5,319,735 A | 6/1994 | Preuss et al. |
| 5,351,304 A | 9/1994 | Yamamoto |
| 5,379,345 A | 1/1995 | Greenberg |
| 5,402,488 A | 3/1995 | Karlock |
| 5,404,160 A | 4/1995 | Schober et al. |
| 5,404,377 A | 4/1995 | Moses |
| 5,408,258 A | 4/1995 | Kolessar |
| 5,414,729 A | 5/1995 | Fenton |
| 5,424,785 A | 6/1995 | Orphan |
| 5,425,100 A | 6/1995 | Thomas et al. |
| 5,432,799 A | 7/1995 | Shimpuku et al. |
| 5,436,653 A | 7/1995 | Ellis et al. |
| 5,450,490 A | 9/1995 | Jensen et al. |
| 5,452,901 A | 9/1995 | Nakada et al. |
| 5,473,631 A | 12/1995 | Moses |
| 5,481,294 A | 1/1996 | Thomas et al. |
| 5,497,372 A | 3/1996 | Nankoh et al. |
| 5,502,576 A | 3/1996 | Ramsay et al. |
| 5,504,518 A | 4/1996 | Ellis et al. |
| 5,508,754 A | 4/1996 | Orphan |
| 5,519,454 A | 5/1996 | Willis |
| 5,526,427 A | 6/1996 | Thomas et al. |
| 5,537,484 A | 7/1996 | Kobayashi |
| 5,579,124 A | 11/1996 | Aijala et al. |
| 5,581,658 A | 12/1996 | O'Hagan et al. |
| 5,581,800 A | 12/1996 | Fardeau et al. |
| 5,592,553 A | 1/1997 | Guski et al. |
| 5,612,729 A | 3/1997 | Ellis et al. |
| 5,613,004 A | 3/1997 | Cooperman et al. |
| 5,636,292 A | 6/1997 | Rhoads |
| 5,664,018 A | 9/1997 | Leighton |
| 5,687,191 A | 11/1997 | Lee et al. |
| 5,687,236 A | 11/1997 | Moskowitz et al. |
| 5,699,427 A | 12/1997 | Chow et al. |
| 5,719,619 A | 2/1998 | Hattori et al. |
| 5,719,937 A | 2/1998 | Warren et al. |
| 5,737,329 A | 4/1998 | Horiguchi |
| 5,752,880 A | 5/1998 | Gabai et al. |
| 5,761,606 A | 6/1998 | Wolzien |
| 5,764,763 A | 6/1998 | Jensen et al. |
| 5,778,108 A | 7/1998 | Coleman, Jr. |
| 5,787,334 A | 7/1998 | Fardeau et al. |
| 5,805,635 A | 9/1998 | Andrews, Jr. et al. |
| 5,809,064 A | 9/1998 | Fenton et al. |
| 5,819,289 A | 10/1998 | Sanford, II et al. |
| 5,822,360 A | 10/1998 | Lee et al. |
| 5,822,432 A | 10/1998 | Moskowitz et al. |
| 5,825,892 A | 10/1998 | Braudaway et al. |
| 5,828,325 A | 10/1998 | Wolosewicz et al. |
| 5,832,119 A | 11/1998 | Rhoads |
| 5,841,978 A | 11/1998 | Rhoads |
| 5,848,155 A | 12/1998 | Cox |
| 5,850,249 A | 12/1998 | Massetti et al. |
| 5,850,481 A | 12/1998 | Rhoads |
| 5,862,260 A | 1/1999 | Rhoads |
| 5,887,243 A | 3/1999 | Harvey et al. |
| 5,889,868 A | 3/1999 | Moskowitz et al. |
| 5,892,900 A | 4/1999 | Ginter et al. |
| 5,893,067 A | 4/1999 | Bender et al. |
| 5,901,178 A | 5/1999 | Lee et al. |
| 5,905,800 A | 5/1999 | Moskowitz et al. |
| 5,930,369 A | 7/1999 | Cox et al. |
| 5,933,798 A | 8/1999 | Linnartz |
| 5,937,000 A | 8/1999 | Lee et al. |
| 5,940,124 A | 8/1999 | Janko et al. |
| 5,940,134 A | 8/1999 | Wirtz |
| 5,940,135 A | 8/1999 | Petrovic et al. |
| 5,940,429 A | 8/1999 | Lam et al. |
| 5,943,422 A | 8/1999 | Van Wie et al. |
| 5,945,932 A | 8/1999 | Smith et al. |
| 5,949,885 A | 9/1999 | Leighton |
| 5,960,081 A | 9/1999 | Vynne et al. |
| 5,963,909 A | 10/1999 | Warren et al. |
| 5,986,692 A | 11/1999 | Logan et al. |
| 6,021,432 A | 2/2000 | Sizer, II et al. |
| 6,031,914 A | 2/2000 | Tewfik et al. |
| 6,035,171 A | 3/2000 | Takaya et al. |
| 6,035,177 A | 3/2000 | Moses et al. |
| 6,044,156 A | 3/2000 | Honsinger et al. |
| 6,061,793 A | 5/2000 | Tewfik et al. |
| 6,067,440 A | 5/2000 | Diefes |
| 6,078,664 A | 6/2000 | Moskowitz et al. |
| 6,094,228 A | 7/2000 | Ciardullo et al. |
| 6,101,310 A | 8/2000 | Terada et al. |
| 6,128,597 A | 10/2000 | Kolluru et al. |
| 6,145,081 A | 11/2000 | Winograd et al. |
| 6,154,571 A | 11/2000 | Cox et al. |

(56) References Cited

U.S. PATENT DOCUMENTS

| | | | |
|---|---|---|---|
| 6,160,986 A | 12/2000 | Gabai et al. |
| 6,173,271 B1 | 1/2001 | Goodman et al. |
| 6,175,627 B1 | 1/2001 | Petrovic et al. |
| 6,189,123 B1 | 2/2001 | Anders Nystrom et al. |
| 6,209,092 B1 | 3/2001 | Linnartz |
| 6,209,094 B1 | 3/2001 | Levine et al. |
| 6,222,932 B1 | 4/2001 | Rao et al. |
| 6,229,572 B1 | 5/2001 | Ciardullo et al. |
| 6,233,347 B1 | 5/2001 | Chen et al. |
| 6,246,775 B1 | 6/2001 | Nakamura et al. |
| 6,246,802 B1 | 6/2001 | Fujihara et al. |
| 6,249,870 B1 | 6/2001 | Kobayashi et al. |
| 6,252,972 B1 | 6/2001 | Linnartz |
| 6,253,113 B1 | 6/2001 | Lu |
| 6,253,189 B1 | 6/2001 | Feezell et al. |
| 6,268,866 B1 | 7/2001 | Shibata |
| 6,278,792 B1 | 8/2001 | Cox et al. |
| 6,282,299 B1 | 8/2001 | Tewfik et al. |
| 6,285,774 B1 | 9/2001 | Schumann et al. |
| 6,289,108 B1 | 9/2001 | Rhoads |
| 6,290,566 B1 | 9/2001 | Gabai et al. |
| 6,330,335 B1 | 12/2001 | Rhoads |
| 6,330,672 B1 | 12/2001 | Shur |
| 6,332,031 B1 | 12/2001 | Rhoads et al. |
| 6,332,194 B1 | 12/2001 | Bloom et al. |
| 6,353,672 B1 | 3/2002 | Rhoads |
| 6,363,159 B1 | 3/2002 | Rhoads |
| 6,373,974 B2 | 4/2002 | Zeng |
| 6,374,036 B1 | 4/2002 | Ryan et al. |
| 6,381,341 B1 | 4/2002 | Rhoads |
| 6,385,330 B1 | 5/2002 | Powell et al. |
| 6,388,712 B1 | 5/2002 | Shinohara et al. |
| 6,389,152 B2 | 5/2002 | Nakamura et al. |
| 6,389,538 B1 | 5/2002 | Gruse et al. |
| 6,400,826 B1 | 6/2002 | Chen et al. |
| 6,400,827 B1 | 6/2002 | Rhoads |
| 6,404,781 B1 | 6/2002 | Kawamae et al. |
| 6,404,898 B1 | 6/2002 | Rhoads |
| 6,411,725 B1 | 6/2002 | Rhoads |
| 6,415,040 B1 | 7/2002 | Linnartz et al. |
| 6,415,041 B1 | 7/2002 | Oami et al. |
| 6,424,726 B2 | 7/2002 | Nakano et al. |
| 6,427,012 B1 | 7/2002 | Petrovic |
| 6,430,301 B1 | 8/2002 | Petrovic |
| 6,430,302 B2 | 8/2002 | Rhoads |
| 6,449,367 B2 | 9/2002 | Van Wie et al. |
| 6,449,496 B1 | 9/2002 | Beith et al. |
| 6,473,560 B1 | 10/2002 | Linnartz et al. |
| 6,477,431 B1 | 11/2002 | Kalker et al. |
| 6,487,301 B1 | 11/2002 | Zhao |
| 6,490,355 B1 | 12/2002 | Epstein |
| 6,496,591 B1 | 12/2002 | Rhoads |
| 6,505,160 B1 | 1/2003 | Levy et al. |
| 6,510,233 B1 | 1/2003 | Nakano |
| 6,510,234 B1 | 1/2003 | Cox et al. |
| 6,512,837 B1 | 1/2003 | Ahmed |
| 6,523,113 B1 | 2/2003 | Wehrenberg |
| 6,529,506 B1 | 3/2003 | Yamamoto et al. |
| 6,530,021 B1 | 3/2003 | Epstein et al. |
| 6,550,011 B1 | 4/2003 | Sims, III |
| 6,553,127 B1 | 4/2003 | Kurowski |
| 6,556,688 B1 | 4/2003 | Ratnakar |
| 6,557,103 B1 | 4/2003 | Boncelet, Jr. et al. |
| 6,570,996 B1 | 5/2003 | Linnartz |
| 6,571,144 B1 | 5/2003 | Moses et al. |
| 6,574,350 B1 | 6/2003 | Rhoads et al. |
| 6,577,744 B1 | 6/2003 | Braudaway et al. |
| 6,584,138 B1 | 6/2003 | Neubauer et al. |
| 6,590,996 B1 | 7/2003 | Reed et al. |
| 6,590,997 B2 | 7/2003 | Rhoads |
| 6,591,365 B1 | 7/2003 | Cookson |
| 6,592,516 B2 | 7/2003 | Lee |
| 6,598,162 B1 | 7/2003 | Moskowitz |
| 6,614,914 B1 | 9/2003 | Rhoads et al. |
| 6,618,484 B1 | 9/2003 | Weber et al. |
| 6,625,297 B1 | 9/2003 | Bradley |
| 6,633,653 B1 | 10/2003 | Hobson et al. |
| 6,636,615 B1 | 10/2003 | Rhoads et al. |
| 6,647,128 B1 | 11/2003 | Rhoads |
| 6,647,129 B2 | 11/2003 | Rhoads |
| 6,654,501 B1 | 11/2003 | Acharya et al. |
| 6,661,905 B1 | 12/2003 | Chupp et al. |
| 6,665,419 B1 | 12/2003 | Oami |
| 6,668,068 B2 | 12/2003 | Hashimoto |
| 6,671,376 B1 | 12/2003 | Koto et al. |
| 6,671,388 B1 | 12/2003 | Op De Beeck et al. |
| 6,674,861 B1 | 1/2004 | Xu et al. |
| 6,674,876 B1 | 1/2004 | Hannigan et al. |
| 6,675,146 B2 | 1/2004 | Rhoads |
| 6,678,389 B1 | 1/2004 | Sun et al. |
| 6,681,029 B1 | 1/2004 | Rhoads |
| 6,683,958 B2 | 1/2004 | Petrovic |
| 6,697,944 B1 | 2/2004 | Jones et al. |
| 6,700,990 B1 | 3/2004 | Rhoads |
| 6,704,431 B1 | 3/2004 | Ogawa et al. |
| 6,707,926 B1 | 3/2004 | Macy et al. |
| 6,728,390 B2 | 4/2004 | Rhoads et al. |
| 6,737,957 B1 | 5/2004 | Petrovic et al. |
| 6,738,495 B2 | 5/2004 | Rhoads et al. |
| 6,744,906 B2 | 6/2004 | Rhoads et al. |
| 6,748,360 B2 | 6/2004 | Pitman et al. |
| 6,751,337 B2 | 6/2004 | Tewfik et al. |
| 6,757,908 B1 | 6/2004 | Vogel |
| 6,768,807 B1 | 7/2004 | Muratani |
| 6,771,797 B2 | 8/2004 | Ahmed |
| 6,785,399 B2 | 8/2004 | Fujihara |
| 6,785,401 B2 | 8/2004 | Walker et al. |
| 6,785,815 B1 | 8/2004 | Serret-Avila et al. |
| 6,792,542 B1 | 9/2004 | Lee et al. |
| 6,798,893 B1 | 9/2004 | Tanaka |
| 6,829,368 B2 | 12/2004 | Meyer et al. |
| 6,834,344 B1 | 12/2004 | Aggarwal et al. |
| 6,834,345 B2 | 12/2004 | Bloom et al. |
| 6,850,626 B2 | 2/2005 | Rhoads et al. |
| 6,856,693 B2 | 2/2005 | Miller |
| 6,880,082 B2 | 4/2005 | Ohta |
| 6,888,943 B1 | 5/2005 | Lam et al. |
| 6,891,958 B2 | 5/2005 | Kirovski et al. |
| 6,912,010 B2 | 6/2005 | Baker et al. |
| 6,912,294 B2 | 6/2005 | Wang et al. |
| 6,912,315 B1 | 6/2005 | Wong et al. |
| 6,915,002 B2 | 7/2005 | Gustafson |
| 6,915,422 B1 | 7/2005 | Nakamura |
| 6,915,481 B1 | 7/2005 | Tewfik et al. |
| 6,931,536 B2 | 8/2005 | Hollar |
| 6,944,313 B1 | 9/2005 | Donescu |
| 6,947,893 B1 | 9/2005 | Iwaki et al. |
| 6,952,774 B1 | 10/2005 | Kirovski et al. |
| 6,961,854 B2 | 11/2005 | Serret-Avila et al. |
| 6,973,195 B1 | 12/2005 | Matsui |
| 6,993,154 B2 | 1/2006 | Brunk |
| 6,996,249 B2 | 2/2006 | Miller et al. |
| 7,007,166 B1 | 2/2006 | Moskowitz et al. |
| 7,020,304 B2 | 3/2006 | Alattar et al. |
| 7,024,018 B2 | 4/2006 | Petrovic |
| 7,043,049 B2 | 5/2006 | Kuzma |
| 7,043,536 B1 | 5/2006 | Philyaw et al. |
| 7,046,808 B1 | 5/2006 | Metois et al. |
| 7,054,461 B2 | 5/2006 | Zeller et al. |
| 7,054,462 B2 | 5/2006 | Rhoads et al. |
| 7,058,815 B2 | 6/2006 | Morin |
| 7,068,809 B2 | 6/2006 | Stach |
| 7,072,492 B2 | 7/2006 | Ogawa et al. |
| 7,103,678 B2 * | 9/2006 | Asai et al. ............ 709/245 |
| 7,107,452 B2 | 9/2006 | Serret-Avila et al. |
| 7,142,691 B2 | 11/2006 | Levy |
| 7,162,642 B2 | 1/2007 | Schumann et al. |
| 7,164,778 B1 | 1/2007 | Nakamura et al. |
| 7,167,599 B1 | 1/2007 | Diehl |
| 7,171,020 B2 | 1/2007 | Rhoads et al. |
| 7,177,429 B2 | 2/2007 | Moskowitz et al. |
| 7,197,368 B2 | 3/2007 | Kirovski et al. |
| 7,206,649 B2 | 4/2007 | Kirovski et al. |
| 7,224,819 B2 | 5/2007 | Levy et al. |

(56) References Cited

U.S. PATENT DOCUMENTS

| | | | |
|---|---|---|---|
| 7,231,061 B2 | 6/2007 | Bradley | |
| 7,289,643 B2 | 10/2007 | Brunk et al. | |
| 7,298,865 B2 | 11/2007 | Lubin et al. | |
| 7,319,759 B1 | 1/2008 | Peinado et al. | |
| 7,321,666 B2 | 1/2008 | Kunisa | |
| 7,334,247 B1 | 2/2008 | Finseth et al. | |
| 7,336,802 B2 | 2/2008 | Kunisa | |
| 7,346,514 B2 | 3/2008 | Herre et al. | |
| 7,369,677 B2 | 5/2008 | Petrovic et al. | |
| 7,389,421 B2 | 6/2008 | Kirovski et al. | |
| 7,450,727 B2 | 11/2008 | Griesinger | |
| 7,454,019 B2 | 11/2008 | Williams | |
| 7,581,103 B2 | 8/2009 | Home et al. | |
| 7,616,776 B2 | 11/2009 | Petrovic et al. | |
| 7,630,497 B2 | 12/2009 | Lotspiech et al. | |
| 7,644,282 B2 | 1/2010 | Petrovic et al. | |
| 7,660,991 B2 | 2/2010 | Nakamura et al. | |
| 7,664,332 B2 | 2/2010 | Wong et al. | |
| 7,693,297 B2 | 4/2010 | Zhang et al. | |
| 7,788,684 B2 | 8/2010 | Petrovic et al. | |
| 7,840,006 B2 | 11/2010 | Ogawa et al. | |
| 7,983,922 B2 | 7/2011 | Neusinger et al. | |
| 7,986,806 B2 | 7/2011 | Rhoads | |
| 7,991,995 B2 * | 8/2011 | Rabin et al. | 713/155 |
| 8,055,013 B2 | 11/2011 | Levy et al. | |
| 8,059,815 B2 | 11/2011 | Lofgren et al. | |
| 8,155,463 B2 | 4/2012 | Wong et al. | |
| 8,346,532 B2 * | 1/2013 | Chakra et al. | 704/1 |
| 2001/0001159 A1 | 5/2001 | Ford | |
| 2001/0021926 A1 | 9/2001 | Schneck et al. | |
| 2001/0022786 A1 | 9/2001 | King et al. | |
| 2001/0044899 A1 | 11/2001 | Levy | |
| 2002/0007403 A1 | 1/2002 | Echizen et al. | |
| 2002/0012443 A1 | 1/2002 | Rhoads et al. | |
| 2002/0033844 A1 | 3/2002 | Levy et al. | |
| 2002/0044659 A1 | 4/2002 | Ohta | |
| 2002/0052885 A1 | 5/2002 | Levy | |
| 2002/0053026 A1 | 5/2002 | Hashimoto | |
| 2002/0054089 A1 | 5/2002 | Nicholas et al. | |
| 2002/0080964 A1 | 6/2002 | Stone et al. | |
| 2002/0080976 A1 | 6/2002 | Schreer | |
| 2002/0082731 A1 | 6/2002 | Pitman et al. | |
| 2002/0095577 A1 | 7/2002 | Nakamura et al. | |
| 2002/0097873 A1 | 7/2002 | Petrovic | |
| 2002/0120849 A1 | 8/2002 | McKinley et al. | |
| 2002/0120854 A1 | 8/2002 | LeVine et al. | |
| 2002/0126842 A1 | 9/2002 | Hollar | |
| 2002/0126872 A1 | 9/2002 | Brunk et al. | |
| 2002/0138734 A1 | 9/2002 | David et al. | |
| 2002/0154144 A1 | 10/2002 | Lofgren et al. | |
| 2002/0168087 A1 | 11/2002 | Petrovic | |
| 2002/0178368 A1 | 11/2002 | Yin et al. | |
| 2003/0009671 A1 | 1/2003 | Yacobi et al. | |
| 2003/0012403 A1 | 1/2003 | Rhoads et al. | |
| 2003/0021439 A1 | 1/2003 | Lubin et al. | |
| 2003/0021441 A1 | 1/2003 | Levy et al. | |
| 2003/0028796 A1 | 2/2003 | Roberts et al. | |
| 2003/0031317 A1 | 2/2003 | Epstein | |
| 2003/0033321 A1 | 2/2003 | Schrempp et al. | |
| 2003/0037075 A1 | 2/2003 | Hannigan et al. | |
| 2003/0053655 A1 | 3/2003 | Barone et al. | |
| 2003/0061489 A1 | 3/2003 | Pelly et al. | |
| 2003/0063747 A1 | 4/2003 | Petrovic | |
| 2003/0072468 A1 | 4/2003 | Brunk et al. | |
| 2003/0076955 A1 | 4/2003 | Alve et al. | |
| 2003/0078891 A1 | 4/2003 | Capitant | |
| 2003/0081809 A1 | 5/2003 | Fridrich et al. | |
| 2003/0112974 A1 | 6/2003 | Levy | |
| 2003/0112997 A1 | 6/2003 | Ahmed | |
| 2003/0115504 A1 | 6/2003 | Holliman et al. | |
| 2003/0131350 A1 | 7/2003 | Peiffer et al. | |
| 2003/0152225 A1 | 8/2003 | Kunisa | |
| 2003/0174862 A1 | 9/2003 | Rhoads et al. | |
| 2003/0177359 A1 | 9/2003 | Bradley | |
| 2003/0179901 A1 | 9/2003 | Tian et al. | |
| 2003/0185417 A1 | 10/2003 | Alattar et al. | |
| 2003/0187679 A1 | 10/2003 | Odgers et al. | |
| 2003/0188166 A1 | 10/2003 | Pelly et al. | |
| 2003/0190054 A1 | 10/2003 | Troyansky et al. | |
| 2003/0190055 A1 | 10/2003 | Kalker et al. | |
| 2003/0200438 A1 | 10/2003 | Kirovski et al. | |
| 2003/0223584 A1 | 12/2003 | Bradley et al. | |
| 2004/0005076 A1 | 1/2004 | Hosaka et al. | |
| 2004/0008864 A1 | 1/2004 | Watson et al. | |
| 2004/0009763 A1 | 1/2004 | Stone et al. | |
| 2004/0010692 A1 | 1/2004 | Watson | |
| 2004/0015400 A1 | 1/2004 | Whymark | |
| 2004/0025176 A1 | 2/2004 | Franklin et al. | |
| 2004/0028255 A1 | 2/2004 | Miller | |
| 2004/0042635 A1 | 3/2004 | Epstein et al. | |
| 2004/0042636 A1 | 3/2004 | Oh | |
| 2004/0073916 A1 | 4/2004 | Petrovic et al. | |
| 2004/0078575 A1 | 4/2004 | Morten et al. | |
| 2004/0088556 A1 | 5/2004 | Weirauch | |
| 2004/0091111 A1 | 5/2004 | Levy et al. | |
| 2004/0093202 A1 * | 5/2004 | Fischer et al. | 704/216 |
| 2004/0093523 A1 | 5/2004 | Matsuzaki et al. | |
| 2004/0098593 A1 | 5/2004 | Muratani | |
| 2004/0101160 A1 | 5/2004 | Kunisa | |
| 2004/0103293 A1 | 5/2004 | Ryan | |
| 2004/0133794 A1 | 7/2004 | Kocher et al. | |
| 2004/0151316 A1 | 8/2004 | Petrovic | |
| 2004/0169581 A1 | 9/2004 | Petrovic et al. | |
| 2004/0174996 A1 | 9/2004 | Tewfik et al. | |
| 2004/0202324 A1 | 10/2004 | Yamaguchi et al. | |
| 2004/0204943 A1 | 10/2004 | Kirovski et al. | |
| 2004/0216157 A1 | 10/2004 | Shain et al. | |
| 2004/0250078 A1 | 12/2004 | Stach et al. | |
| 2005/0008190 A1 | 1/2005 | Levy et al. | |
| 2005/0010779 A1 | 1/2005 | Kobayashi et al. | |
| 2005/0013462 A1 | 1/2005 | Rhoads | |
| 2005/0025332 A1 | 2/2005 | Seroussi | |
| 2005/0050332 A1 | 3/2005 | Serret-Avila et al. | |
| 2005/0071669 A1 | 3/2005 | Medvinsky et al. | |
| 2005/0120220 A1 | 6/2005 | Oostveen et al. | |
| 2005/0196051 A1 | 9/2005 | Wong et al. | |
| 2005/0202781 A1 | 9/2005 | Steelberg et al. | |
| 2005/0251683 A1 | 11/2005 | Levy et al. | |
| 2006/0005029 A1 | 1/2006 | Petrovic et al. | |
| 2006/0056653 A1 | 3/2006 | Kunisa | |
| 2006/0062426 A1 | 3/2006 | Levy et al. | |
| 2006/0104477 A1 | 5/2006 | Isogai et al. | |
| 2006/0227968 A1 | 10/2006 | Chen et al. | |
| 2006/0239501 A1 | 10/2006 | Petrovic et al. | |
| 2007/0003103 A1 | 1/2007 | Lemma et al. | |
| 2007/0005500 A1 | 1/2007 | Steeves et al. | |
| 2007/0039018 A1 | 2/2007 | Saslow et al. | |
| 2007/0100483 A1 | 5/2007 | Kentish et al. | |
| 2007/0110237 A1 | 5/2007 | Tehranchi et al. | |
| 2007/0143617 A1 | 6/2007 | Farber et al. | |
| 2007/0150418 A1 | 6/2007 | Ben-Menahem et al. | |
| 2007/0168673 A1 | 7/2007 | Van Der Veen et al. | |
| 2007/0177761 A1 | 8/2007 | Levy | |
| 2007/0192261 A1 | 8/2007 | Kelkar et al. | |
| 2007/0208711 A1 | 9/2007 | Rhoads et al. | |
| 2007/0223708 A1 | 9/2007 | Villemoes et al. | |
| 2008/0002854 A1 | 1/2008 | Tehranchi et al. | |
| 2008/0016360 A1 | 1/2008 | Rodriguez et al. | |
| 2008/0031463 A1 | 2/2008 | Davis | |
| 2008/0209219 A1 | 8/2008 | Rhein | |
| 2008/0310629 A1 | 12/2008 | Van Der Veen et al. | |
| 2008/0310673 A1 | 12/2008 | Petrovic et al. | |
| 2008/0313741 A1 | 12/2008 | Alve et al. | |
| 2009/0031134 A1 | 1/2009 | Levy | |
| 2009/0172405 A1 | 7/2009 | Shiomi et al. | |
| 2009/0262932 A1 | 10/2009 | Petrovic | |
| 2009/0326961 A1 | 12/2009 | Petrovic et al. | |
| 2010/0034513 A1 | 2/2010 | Nakano et al. | |
| 2010/0121608 A1 | 5/2010 | Tian et al. | |
| 2010/0146286 A1 | 6/2010 | Petrovic et al. | |
| 2010/0214307 A1 | 8/2010 | Lee et al. | |
| 2010/0226525 A1 | 9/2010 | Levy et al. | |
| 2010/0228857 A1 | 9/2010 | Petrovic et al. | |
| 2010/0287579 A1 | 11/2010 | Petrovic et al. | |

(56) References Cited

U.S. PATENT DOCUMENTS

| | | |
|---|---|---|
| 2010/0287609 A1 | 11/2010 | Gonzalez et al. |
| 2011/0016172 A1 | 1/2011 | Shah |
| 2011/0068898 A1 | 3/2011 | Petrovic et al. |
| 2011/0091066 A1 | 4/2011 | Alattar |
| 2011/0103444 A1 | 5/2011 | Baum et al. |
| 2011/0123063 A1 | 5/2011 | Delp et al. |
| 2011/0202687 A1 | 8/2011 | Glitsch et al. |
| 2011/0209191 A1 | 8/2011 | Shah |
| 2011/0219229 A1 | 9/2011 | Cholas et al. |
| 2011/0225427 A1 | 9/2011 | Wood et al. |
| 2011/0286625 A1 | 11/2011 | Petrovic et al. |
| 2011/0293090 A1 | 12/2011 | Ayaki et al. |
| 2011/0311056 A1 | 12/2011 | Winograd |
| 2012/0017091 A1 | 1/2012 | Petrovic et al. |
| 2012/0026393 A1 | 2/2012 | Petrovic et al. |
| 2012/0072729 A1 | 3/2012 | Winograd et al. |
| 2012/0072730 A1 | 3/2012 | Winograd et al. |
| 2012/0072731 A1 | 3/2012 | Winograd et al. |
| 2012/0084870 A1 | 4/2012 | Petrovic |
| 2012/0130719 A1 | 5/2012 | Petrovic et al. |
| 2012/0203556 A1 | 8/2012 | Villette et al. |
| 2012/0300977 A1 | 11/2012 | Petrovic et al. |
| 2013/0007462 A1 | 1/2013 | Petrovic et al. |
| 2013/0011006 A1 | 1/2013 | Petrovic et al. |
| 2013/0114847 A1 | 5/2013 | Petrovic et al. |
| 2013/0114848 A1 | 5/2013 | Petrovic et al. |
| 2013/0117570 A1 | 5/2013 | Petrovic et al. |
| 2013/0117571 A1 | 5/2013 | Petrovic et al. |
| 2013/0132727 A1 | 5/2013 | Petrovic |
| 2013/0142382 A1 | 6/2013 | Petrovic et al. |
| 2013/0151855 A1 | 6/2013 | Petrovic et al. |
| 2013/0151856 A1 | 6/2013 | Petrovic et al. |
| 2013/0152210 A1 | 6/2013 | Petrovic et al. |

FOREIGN PATENT DOCUMENTS

| | | |
|---|---|---|
| EP | 372601 A1 | 6/1990 |
| EP | 581317 A2 | 2/1994 |
| EP | 1137250 A1 | 9/2001 |
| EP | 2166725 A1 | 3/2010 |
| GB | 2260246 A | 4/1993 |
| GB | 2292506 A | 2/1996 |
| GB | 2363027 A | 12/2001 |
| JP | 10-150548 A | 6/1998 |
| JP | 11-086435 A | 3/1999 |
| JP | 11-284516 A | 10/1999 |
| JP | 11-346302 A | 12/1999 |
| JP | 2000-069273 A | 3/2000 |
| JP | 2000083159 A | 3/2000 |
| JP | 2000-174628 A | 6/2000 |
| JP | 2000163870 A | 6/2000 |
| JP | 2000216981 A | 8/2000 |
| JP | 2001022366 A | 1/2001 |
| JP | 2001-119555 A | 4/2001 |
| JP | 2001175270 A | 6/2001 |
| JP | 2001-188549 A | 7/2001 |
| JP | 2001-216763 A | 8/2001 |
| JP | 2001-218006 A | 8/2001 |
| JP | 2001245132 A | 9/2001 |
| JP | 2001-312570 A | 11/2001 |
| JP | 2001-527660 A | 12/2001 |
| JP | 2002-010057 | 1/2002 |
| JP | 2002-024095 A | 1/2002 |
| JP | 2002-027223 A | 1/2002 |
| JP | 2002-091465 A | 3/2002 |
| JP | 2002091712 A | 3/2002 |
| JP | 2002135557 A | 5/2002 |
| JP | 2002-165191 A | 6/2002 |
| JP | 2002176614 A | 6/2002 |
| JP | 2002-519916 A | 7/2002 |
| JP | 2002-232693 A | 8/2002 |
| JP | 2002232412 A | 8/2002 |
| JP | 2002319924 A | 10/2002 |
| JP | 2002354232 A | 12/2002 |
| JP | 2003-008873 A | 1/2003 |
| JP | 2003-039770 A | 2/2003 |
| JP | 2003-091927 A | 3/2003 |
| JP | 2003-230095 A | 8/2003 |
| JP | 2003-244419 A | 8/2003 |
| JP | 2003-283802 A | 10/2003 |
| JP | 2003316556 A | 11/2003 |
| JP | 2004-023786 A | 1/2004 |
| JP | 2004070606 A | 3/2004 |
| JP | 2004-163855 A | 6/2004 |
| JP | 2004173237 A | 6/2004 |
| JP | 2004-193843 A | 7/2004 |
| JP | 2004194233 A | 7/2004 |
| JP | 2004-328747 A | 11/2004 |
| JP | 2005051733 A | 2/2005 |
| JP | 2005525600 A | 8/2005 |
| JP | 20080539669 | 11/2008 |
| JP | 20100272920 | 12/2010 |
| KR | 20100009384 A | 1/2010 |
| WO | 94-10771 | 5/1994 |
| WO | 95-14289 | 5/1995 |
| WO | 97-09797 | 3/1997 |
| WO | 97-33391 | 9/1997 |
| WO | 98-53565 | 11/1998 |
| WO | 99-03340 | 1/1999 |
| WO | 99-39344 | 5/1999 |
| WO | 99-45706 | 10/1999 |
| WO | 99-62022 | 12/1999 |
| WO | 00-00969 | 1/2000 |
| WO | 00-13136 | 3/2000 |
| WO | 00-56059 | 9/2000 |
| WO | 01-54035 | 7/2001 |
| WO | 01-55889 | 8/2001 |
| WO | 0197128 A1 | 12/2001 |
| WO | 0219589 A1 | 3/2002 |
| WO | 0223883 A2 | 3/2002 |
| WO | 0249363 A1 | 6/2002 |
| WO | 0295727 A1 | 11/2002 |
| WO | 03052598 A1 | 6/2003 |
| WO | 2005-027501 | 3/2005 |
| WO | 2005038778 | 4/2005 |
| WO | 2006051043 A1 | 5/2006 |
| WO | 2006116394 A2 | 11/2006 |
| WO | 2010073236 A1 | 7/2010 |
| WO | 2013067439 A1 | 5/2013 |

OTHER PUBLICATIONS

International Search Report and Written Opinion dated Mar. 18, 2013 for International Application No. PCT/US2012/063431, filed Nov. 2, 2012 (10 pages).
Jacobsmeyer, J., et al., "Introduction to error-control coding," Pericle Communications Company, 2004 (16 pages).
Kalker, T., et al., "A security risk for publicly available watermark detectors," Proc. Benelux Info. Theory Symp., Veldhoven, The Netherlands, May 1998 (7 pages).
Kalker, T., et al., "System issues in digital image and video watermarking for copy protection," Proc. IEEE Int. Conf. on Multimedia Computing and Systems, pp. 562-567, Jun. 1999.
Kang, X., et al., "A DWT-DFT composite watermarking scheme robust to both affine transform and JPEG compression," IEEE Transactions on Circuits and Systems for Video Technology, 8(13):776-786 Aug. 2003.
Kim, T.Y., et al., "An asymmetric watermarking system with many embedding watermarks corresponding to one detection watermark," IEEE Signal Processing Letters, 3(11):375-377, Mar. 2004.
Kirovski, D., et al., "Multimedia content screening using a dual watermarking and fingerprinting system," Proceedings of the tenth ACM international conference, pp. 372-381, 2002.
Kirovski, D., et al., "Randomizing the replacement attack," ICASSP, pp. 381-384, 2004.
Kirovski, D., et al., "Robust spread-spectrum audio watermarking," IEEE International Conference on Acoustics, Speech, and Signal Processing, 3:1345-1348, 2001.
Kirovski, D., et al., "Multimedia content screening using a dual watermarking and fingerprinting system," Multimedia '02 Proceedings of the ACM international conference on Multimedia, 2002 (11 pages).

(56) References Cited

OTHER PUBLICATIONS

Kocher, P., et al., "Self-Protecting Digital Content: A Technical Report from the CRI Content Security Research Initiative," Cryptography Research, Inc. (CRI), 2002-2003 (14 pages).
Kutter, M., et al., "The watermark copy attack," Proc. of the SPIE: Security and Watermarking of Multimedia Content II, 3971:1-10, Jan. 2000.
Kuznetsov, A.V., et al., "An error correcting scheme for defective memory," IEEE Trans. Inf. Theory, 6(4):712-718, Nov. 1978 (7 pages).
Lacy, J., et al., "Intellectual property protection systems and digital watermarking," Proceedings: Information Hiding, Second International Workshop, Portland, Oregon, pp. 158-168, 1998.
Lin, E.T., et al., "Detection of image alterations using semi-fragile watermarks," Proceedings of the SPIE International Conference on Security and Watermarking of Multimedia Contents II, Jan. 2000 (12 pages).
Lin, P.L., et al., "Robust transparent image watermarking system with spatial mechanisms," The Journal of Systems and Software, 50:107-116, Feb. 2000.
Lotspeich, J., "The Advanced Access Content System's Use of Digital Watermarking," MCPS '06, Oct. 28, 2006, pp. 19-21.
Lu, C.S., et al., "Oblivious cocktail watermarking by sparse code shrinkage: A regional-and global-based scheme," IEEE Transactions on Multimedia, 4(2):209-224, Dec. 2000.
Maehara, F., et al., "A proposal of multimedial home education terminal system based on flash-squeak OS," Technical report of the institute of image information and television engineers, 28(43):21-24, Jul. 2004.
Mason, A. J., et al., "User requirements for watermarking in broadcast applications," IEEE Conference Publication, International Broadcasting Convention (BC 2000), Amsterdam, Sep. 8-12, 2000 (7 pages).
Mintzer, F., et al., "If one watermark is good, are more better?," Acoustics, Speech, and Signal Processing, ICASSP, 4:2067-2069, Mar. 1999.
Mobasseri, B.G., et al. "Content authentication and tamper detection in digital video," Image Processing Proceedings, International Conference, 1:458-461, 2000.
Moulin, P., et al., "Detection-theoretic analysis of desynchronization attacks in watermarking, " Technical Report MSR-TR-2002-24, Microsoft Corporation, Mar. 2002.
Muranoi, R., et al., "Video retrieval method using shotID for copyright protection systems," Proc. SPIE Multimedia Storage and Archiving Systems III, 3527:245-252, Nov. 1998.
Nikolaidis, N., et al., "Watermark detection: benchmarking perspectives," 2002 IEEE Conference on Multimedia and Expo, 2002 (4 pages).
Office Action dated Jul. 21, 2011 for Japanese Patent Application No. 2008-508985 (6 pages).
Office Action dated Mar. 16, 2012 for Japanese Patent Application No. 2008-508985 (8 pages).
Office Action dated Mar. 18, 2011 for European Patent Application No. 03774648.4 (6 pages).
Office Action dated May 8, 2012 for Japanese Patent Application No. 2009-522802 (4 pages).
Office Action dated Nov. 26, 2012 for Japanese Patent Application No. 2011-114667 (8 pages).
Office Action dated Nov. 28, 2012 for Japanese Patent Application No. 2011-114666 (8 pages).
Park, J.H., et al., "Robust and fragile watermarking techniques for documents using bidirectional diagonal profiles," Information and Communications Security: Third International Conference, Xian, China, Nov. 2001, pp. 483-494.
Perez-Gonzalez, F., et al., "Approaching the capacity limit in image watermarking a perspective on coding techniques for data hiding applications," Signal Processing, 6(81):1215-1238 Jun. 2001.
Petitcolas, F., et al., "The blind pattern matching attack on watermark systems," IEEE Trans. Signal Processing, Apr. 2003 (4 pages).
Petitcolas, F.A.P., et al., "Attacks on copyright marking systems," Second Workshop on Information Hiding, Lecture Notes in Computer Science, Portland, Oregon, pp. 218-238, Apr. 1998.
Philips Research Liquid Audio Fraunhofer Institute, "Digital Audio Screening Technology for Phased Rollout," Version 1.00, May 1999 (38 pages).
Pytlak, J.,"Anti-piracy coding," URL: http://www.tele.com/pipermail/tig/2003-November/003842.html; Nov. 2003 (2 pages).
RSA Laboratories, "Frequently asked questions about today's cryptography," Version 4.1, May 2000 (37 pages).
Schneier, B., "Applied cryptography, second edition: protocols, algorithms and source code in C," Oct. 1995 (10 pages).
Seok, J., et al., "A novel audio watermarking algorithm for copyright protection of digital audio," ETRI Journal, 24(3):181-189, Jun. 2002.
Shih, F.Y., et al., "Combinational, image watermarking in the spatial and frequency domains," Pattern Recognition, 36:696-975, May 2002.
Solanki, K., et al., "Robust image-adaptive data hiding: modeling, source coding and channel coding", 41st Allerton Conference on Communications, Control and Computing, Oct. 2003 (10 pages).
Steinebach, M., et al., "Stir Mark benchmark: audio watermarking attacks," International Conference on Information Technology: Coding and Computing (ITCC 2001), Las Vegas, Nevada, Apr. 2001 (6 pages).
Tanaka, K., et al., "Secret transmission method of character data in motion picture communication," SPIE Visual Communications and Image Processing '91, 1605:646-649, 1991.
Tsai, M.J., et al., "Wavelet packet and adaptive spatial transformation of watermark for digital image authentication," IEEE Image Processing, 2000 International Conference, 1:450-453, 2000 (4 pages).
Verance Corporation, "Confirmedia," PowerPoint presentation made to National Association of Broadcasters; Apr. 24, 2001 (40 pages).
Wolfgang, R., et al., "Perceptual watermarks for digital images and video," Proceedings of the IEEE, 87 (7):1108-1126, Jul. 1999.
Xu, C., et al., "Applications of digital watermarking technology in audio signals," Journal of Audio Eng. Soc., 10 (47):805-812, Oct. 1999.
Yeung, M. M., et al., "An invisible watermarking technique for image verification," Image Processing, International Conference Proceedings, 2:680-683, Oct. 26-29 1997.
Zhao, J., "A WWW service to embed and prove digital copyright watermarks," Proc. European Conf. on Multimedia Applications, Services and Techniques (ECMAST'96), May 1996 (15 pages).
"Advanced Access Content System (AACS), Pre-recorded Video Book," Revision 0.951, Sep. 2009 (86 pages).
"Content Protection—Self Protecting Digital Content," http://www.cryptography.com/technology/spdc/index.html, May 2010 (1 page).
"Microsoft response to CfP for technology solutions to screen digital audio content for LCM acceptance," Microsoft Corporation, May 23, 1999 (9 pages).
"Task AC122-copy protection for distribution services," Http://acad.bg/WISE/english/rd/partners/acts/areal/ac122-t.html, Jul. 1, 1997 (2 pages).
Adelsbach, A., et al., "Proving Ownership of Digital Content," Proc. 3rd Int. Workshop on Information Hiding, 1768:117-133, Sep. 1999.
Aggarwal, A., et al., "Multi-Layer Grid Embeddings," Foundations of Computer Science, 26th Annual Symposium on Foundations of Computer Science, 85:186-196, Oct. 1985.
Aris Technologies, Inc. "Audio Watermarking System to Screen Digital Audio Content for LCM Acceptance," May 1999 (17 pages).
Bangaleea, R., et al., "Performance improvement of spread spectrum spatial-domain watermarking scheme through diversity and attack characterisation," IEEE Africon, pp. 293-298, 2002.
Barreto, P.S.L.M., et al. "Toward Secure Public-Key Blockwise Fragile Authentication Watermarking," IEEE Proceedings Vision, Image, and Signal Processing, 149(2):57-62, Apr. 2002.
Boney, L., et al., "Digital Watermarks for Audio Signals," Dept. of Electrical Engineering, Univ. of Minnesota, Mar. 1996 (4 pages).
Cappellini, V., et al. "Robust Frame-based Watermarking for Digital Video," Proceedings of the 12th International Workshop on Database and Expert Systems Applications, Sep. 2001 (5 pages).

(56) References Cited

OTHER PUBLICATIONS

Caronni, G., "Assuring Ownership Rights for Digital Images," Proceedings of reliable IT systems VIS 95, Vieweg Publishing Company, Germany, 1995 (10 pages).
Chen, B. et al., "Quantization index modulation: a class of provably good methods for digital watermarking and information embedding," IEEE Transactions on Information Theory, 47(4):1423-1443 May 2001.
Chou, J., et al., "A Robust Blind Watermarking Scheme based on Distributed Source Coding Principles," Multimedial 2000 Proceedings of the eighth ACM international conference on multimedia, Los Angeles, California, 2000 (8 pages).
Chou, J., et al., "A Robust Optimization Solution to the Data Hiding Problem using Distributed Source Coding Principles," Pro. SPIE, 3971, San Jose, California, Jan. 2000 (10 pages).
Cinea, Inc., "Forensic watermarking deterring video piracy," 2004, (9 pages).; [http://www.cinea.com/whitepapers/forensic_watermarking.pdf].
Costa, M., "Writing on Dirty Paper," IEEE Trans. on Info. Theory, 29(3):439-441, May 1983.
Cox, I. J., et al., "Some general methods for tampering with watermarks," IEEE Journal on Selected Areas in Communications, 16(4): 587-593, May 1998.
Coxford, A., et al., "Advanced Mathematics: A Preparation for Calculus, Second Edition," Harcourt Brace Jovanovish, Inc., 1978 (14 pages).
Das, et al., "Distributed Priority Queues on Hybercube Architectures," IEEE, 1996, pp. 620-627.
Davidson, M.F., "Music File Filter," Sony Music, New York, May 23, 1999 (2 pages).
Digimarc Corporation, "Digimarc Watermarking Guide," 1999 (22 pages).
Dittmann, J., "Combining digital watermarks and collusion secure fingerprints for customer copy monitoring," Proc. IEEE Seminar on Secure Images and Image Authentication, Apr. 2000 (6 pages).
Dittmann, J., et al., "Combining digital watermarks and collusion secure fingerprints for digital images," Proc. SPIE 3657:171-182, Jan. 1999 (12 pages).
Epp, L.W., et al., "Generalized scattering matrices for unit cell characterization of grid amplifiers and device de-embedding," IEEE, 2:1288-1291, Jun. 1995.
European Search Report dated Apr. 12, 2012 for European Patent Application No. 07836262.1 filed Jul. 25, 2007 (12 pages).
European Search Report dated Jul. 3, 2012 for European Patent Application No. 12150742.0, filed Oct. 7, 2003 (5 pages).
European Search Report dated Nov. 10, 2010 for European Patent Application No. 03774648.4, filed Oct. 7, 2003 (5 pages).
European Search Report dated Oct. 24, 2012 for European Patent Application No. 06758537.2, filed Apr. 21, 2006 (6 pages).
European Search Report dated Oct. 31, 2012 for European Patent Application No. 06758577.8, filed Apr. 25, 2006 (6 pages).
Furon, T., et al., "An asymmetric watermarking method," IEEE Trans. Signal Processing, 4(51):981-995, Apr. 2003.
Guth, H.J. et al., "Error-and collusion-secure fingerprinting for digital data," Proc. 3rd Int. Workshop on Information . Hiding, LNCS 1768:134-145, Sep./Oct. 1999.
Hartung, F., et al., "Digital watermarking of MPEG-2 coded video in the bitstream domain," Proc. IEEE Int. Conf. on Acoustics, Speech and Signal Processing, 4:2621-2624, Apr. 1997.
Hartung, F., et al., "Watermarking of MPEG-2 encoded video without decoding and re-coding," Proc. SPIE Multimedia Computing and Networking 97, 3020:264-274, Feb. 1997.
Hartung, F., et al., "Watermarking of uncompressed and compressed video," Signal Processing, 3(66):283-301, May 1998.
Heegard, C., et al., "On the capacity of computer memory with defects," IEEE Trans. Info. Theory, 5(IT-29):731-739, Sep. 1983.
International Search Report and Written Opinion dated Apr. 8, 2013 for International Application No. PCT/US2012/069306, filed Dec. 12, 2012 (12 pages).
International Search Report and Written Opinion dated Mar. 25, 2013 for International Application No. PCT/US2012/069302, filed Dec. 12, 2012 (22 pages).
International Search Report and Written Opinion dated Apr. 24, 2012 for International Application No. PCT/US2011/051857, filed Sep. 15, 2011 (9 pages).
International Search Report and Written Opinion dated Aug. 14, 1998 for International Application No. PCT/US1998/009587, filed May 12, 1998 (3 pages).
International Search Report and Written Opinion dated Aug. 22, 2007 for International Application No. PCT/US2006/031267, filed Aug. 9, 2006 (2 pages).
International Search Report and Written Opinion dated Feb. 14, 2002 for International Application No. PCT/US2001/026505, filed Aug. 27, 2001 (2 pages).
International Search Report and Written Opinion dated Feb. 28, 2013 for International Application No. PCT/US2012/066138, filed Nov. 20, 2012 (11 pages).
International Search Report and Written Opinion dated Jan. 4, 2008 for International Application No. PCT/US2006/015615, filed Apr. 25, 2006 (5 pages).
International Search Report and Written Opinion dated Mar. 14, 2013 for International Application No. PCT/US2012/069308, filed Dec. 12, 2012 (10 pages).
International Search Report and Written Opinion dated Mar. 28, 2012 for International Application No. PCT/US2011/051855, filed Sep. 15, 2011 (8 pages).
International Search Report and Written Opinion dated May 13, 2008 for International Application No. PCT/US2006/025090, filed Jun. 27, 2006 (2 pages).
International Search Report and Written Opinion dated May 19, 2004 for International Application No. PCT/US2003/031816, filed Apr. 29, 2004 (3 pages).
International Search Report and Written Opinion dated May 29, 2008 for International Application No. PCT/US2006/015410, filed Apr. 21, 2006 (6 pages).
International Search Report and Written Opinion dated Sep. 26, 2008 for International Application No. PCT/US2007/016812, filed Jul. 25, 2007 (6 pages).

* cited by examiner

EFFICIENT AND SECURE FORENSIC MARKING IN COMPRESSED DOMAIN

RELATED APPLICATIONS

This patent application is a continuation application of and claims priority to U.S. patent application Ser. No. 13/567,792, filed Aug. 6, 2012, which is a continuation of U.S. patent application Ser. No. 12/488,397, filed Jun. 19, 2009, now U.S. Pat. No. 8,259,938, which claims the benefit of priority to U.S. Provisional Patent Application No. 61/075,289 filed on Jun. 24, 2008, which is incorporated herein by reference in its entirety for all purposes.

FIELD OF INVENTION

The present invention generally relates to the field of digital watermarking. More particularly, the present invention relates to efficient and secure embedding and detection of watermarks in a content that is in compressed domain.

BACKGROUND OF THE INVENTION

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Digital watermarks have been proposed and used for copyright protection of signals such as audio, video, and images. An objective of such watermarking systems is to hide an auxiliary signal within a host signal in such a way that it is substantially imperceptible, and at the same time, difficult to remove without damaging the host signal. The auxiliary signal may carry information that is used to carry out copyright protection mechanisms to varying degrees. For example, the auxiliary signal may merely comprise a "no copy allowed" indication that, once detected and interpreted by a compliant copying device, prevents copying of the host signal. Additionally, or alternatively, the embedded auxiliary signal may carry information that identifies one or more of the rightful owner, author, title or serial number of the host signal. The information contained in the auxiliary signal can also be used for other applications, such as to monitor the usage of embedded content, resolve ownership disputes, keep track of royalties, and the like.

Another application related to digital watermarking involves distinguishing different copies of the same host signal by embedding a unique watermark value into individual copies of a host signal. These applications are sometimes referred to as forensic marking (because the unique watermarks may be used to trace the content to an offending party), transaction marking (because the unique watermarks can identify each legitimate transaction), or fingerprinting (because the unique watermarks can identify perceptually similar host signals, much like fingerprints can identify individuals). Once a content is forensically marked, the embedded watermarks may be used to identify the original source (i.e., legitimate purchaser) of a content, and monitor the subsequent spread of that content through piracy channels. For example, a pirate may purchase a music track over the Internet from a legitimate distributor, directly or using a proxy. Then, the pirate may resell or otherwise redistribute the content in an unauthorized fashion. A similar scenario can occur in the distribution of video or other types of content such as still photos, computer graphics, computer games, and the like that may be distributed over the Internet, or in case of video or music, over "pay-per-view" channels in a cable or satellite TV network. Similarly, copyrighted content that is distributed internally within a content production/distribution entity, or to reviewers or critics prior to their public release, may be illegally used or redistributed. In all of the above cases, it is important to identify the offending party and recover and/or prevent further unauthorized dissemination of the content. Often the fact that forensic marks are present in the content is enough to deter such illegal activities.

Efficient design of a forensic marking procedure is often an important consideration of forensic marking systems since the same host signal often needs to be marked many times. On the other hand, efficient detection of embedded marks may not be a critical consideration for forensic marking systems since watermark detection often takes place only when an illicit activity is detected or suspected. This feature of forensic marking systems may be contrasted to copy-control watermarking systems, where the emphasis is typically on providing a simple extraction method that is easily implemented and carried out in consumer devices, while the embedding (or marking) procedure can be more elaborate and computationally expensive.

Efficiency of a forensic marking system is further complicated due to the fact that a host content (e.g., music, image or video), especially a content that is distributed over the Internet, is often stored and distributed in a compressed format (e.g., MP3 format for music files). In a conventional marking system, the forensic marks are typically applied by first decompressing the host content, embedding the appropriate marks, and re-compressing the content prior to distribution or storage. This procedure has several disadvantages. First, since most compression algorithms involve lossy operations, each round of content decompression and re-compression may further degrades the perceptual quality of the host content. Second, decompression, and, particularly, compression operations are computationally expensive. Therefore, it may not be computationally feasible to decompress and re-compress a content in response to each individual purchase request of that content. It is thus advantageous to apply forensic marks without decompressing and re-compressing the host content.

SUMMARY OF THE INVENTION

The present invention relates to systems, methods, devices, and computer program products that enable the application of forensic marks to a host content that is in compressed domain. One aspect of the present invention is related to a method for embedding forensic marks in a host content in compressed domain, comprising: receiving metadata associated with a request for the host content, generating a code in accordance with the metadata, selecting a plurality of tributary segments that are in compressed domain in accordance with the code, and assembling the segments to produce a forensically marked host content in compressed domain. In one example embodiment, the metadata comprises information for identifying the request, while in another example embodiment, the information comprises at least one of a transaction identification, intended destination of the forensically marked host content, and time, date, and source of the request.

In accordance with another example embodiment, the transaction metadata and the code are stored in a database. In yet another example embodiment, the plurality of tributaries are generated by a preprocessing module and stored in a storage unit. According to another embodiment, the tributaries comprise one or more versions of the host content, each version having been embedded with a string of unique watermark symbols and compressed thereafter. In a different embodiment, the watermark symbols are embedded contiguously in each of the versions. Still, in a different embodiment, the tributaries comprise an unmarked host content and at least one version of the host content that is embedded with a string of unique watermark symbols.

According to another embodiment, the tributaries comprise compression units, each compression unit having been embedded with a unique string of watermark symbols. In one example embodiment, the compression units span the entirety of the host content with no intervening unmarked segments. In another embodiment, a watermark symbol interval spans an integer multiple number of the compression units, and in a different embodiment, a watermark symbol interval boundary matches the boundary of an integer number of the compression units. According to another embodiment, the compression units correspond to at least one of a time, a space, and a time-and-space domains. In yet another embodiment, watermarking parameters are adjusted in accordance with compression techniques used for compressing the tributaries. In another example embodiment, the host content is an audio content, and the tributaries are produced using at least one of an AAC, AACplus, and MP3 compression techniques. In still a different embodiment, assembling comprises back-to-back concatenation of the segments.

In another embodiment, the host content is an audio content, the tributaries are compressed using a AAC compressor, and the selecting comprises: selecting a first segment from a first tributary in accordance with a first symbol of the code, selecting a second segment in accordance with a second symbol of the code, wherein if the second symbol is the same as the first symbol, selecting the second segment from the first tributary, and if the second symbol is different from the first symbol, selecting the second segment from a second tributary. According to another embodiment, if selecting the second segment from a second tributary creates perceptual artifacts, selecting the second segment from the first tributary.

According to yet another embodiment, the tributaries are distorted to obstruct differential analysis of the forensically marked host content. In one example embodiment, the distortion comprises non-linear amplitude modification of the host content samples, while in another example embodiment, the distortion comprises applying a different random phase offset to samples of each of the plurality of tributaries prior to the selecting. In still another example embodiment, the distortion comprises modifying the Dynamic Range Control (DRC) bits associated with the tributaries that are in AAC format.

Another aspect of the present invention relates to a device for embedding forensic marks in a host content in compressed domain, comprising: a receiving means configured to receive metadata associated with a request for the host content; a code generator configured to generate a code in accordance with the metadata; a selector configured to select a plurality of tributary segments that are in compressed domain in accordance with the code; and an assembly means configured to assemble the segments to produce a forensically marked host content in compressed domain. Yet another aspect of the present invention relates to a computer program product, embodied on a computer readable medium, for embedding forensic marks in a host content in compressed domain, the computer program product comprising: a computer code for receive metadata associated with a request for the host content; a computer code for generating a code in accordance with the metadata; a computer code for selecting a plurality of tributary segments that are in compressed domain in accordance with the code; and a computer code for assembling the segments to produce a forensically marked host content in compressed domain.

These and other advantages and features of various embodiments of the present invention, together with the organization and manner of operation thereof, will become apparent from the following detailed description when taken in conjunction with the accompanying drawings.

BRIEF DESCRIPTION OF THE DRAWINGS

Embodiments of the invention are described by referring to the attached drawings, in which.

DETAILED DESCRIPTION OF CERTAIN EMBODIMENTS

Figure 1:
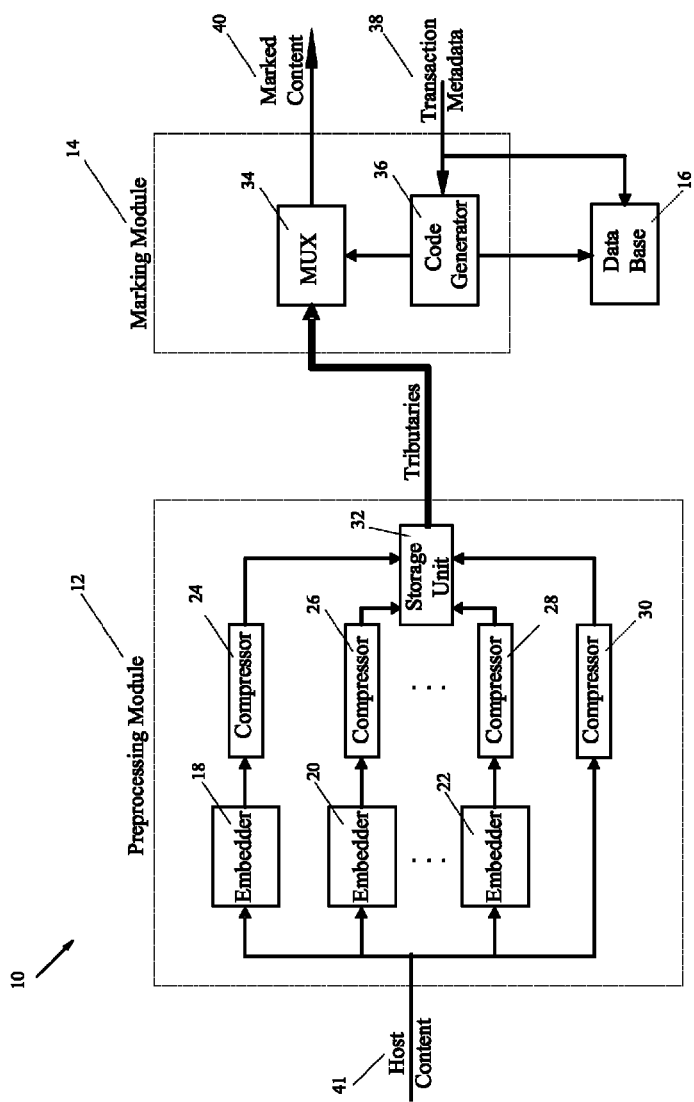
FIG. 1 illustrates a block diagram for forensic marking in accordance with an example embodiment of the present invention.

In the following description, for purposes of explanation and not limitation, details and descriptions are set forth in order to provide a thorough understanding of the present invention. However, it will be apparent to those skilled in the art that the present invention may be practiced in other embodiments that depart from these details and descriptions.

The various embodiments of the present invention enable the application of forensic marks to a host content that is in compressed domain. The detection and recovery of such forensic marks from the host content may be carried out using either conventional watermark detection systems (e.g., computationally inexpensive detectors that are implemented in consumer devices) or may be accomplished with more sophisticated forensic detectors with enhanced detection capabilities.

One consideration in designing and applying the forensic marks to a host content is resiliency of the embedded marks against collusion attacks and differential analysis. For example, an attacker may obtain two copies of a host content with different embedded marks, subtract the two copies, analyze the difference signal in order to gain information regarding the watermarking technique, and devise sophisticated attacks to remove or interfere with the embedded watermarks. Furthermore, an attacker may average a number of copies of a host content in order to weaken individual marks within each content, make them interfere, and eventually render them undetectable. An attacker may also cut different segments from different copies of a host content and splice them together to produce a single copy with multiple forensic marks. This type of attack makes it difficult to identify a single source of piracy.

Commonly owned U.S. Pat. No. 6,430,301, entitled "Formation and Analysis of Signals with Common and Transaction Watermarks," describes a technique that allows the application of forensic marks in compressed domain while providing substantial immunity against collusion attacks. However, the technique disclosed in U.S. Pat. No. 6,430,301 requires the presence of "Common Watermarks" within a host content that are interleaved with "Transaction Watermarks." The Common Watermark intervals are situated between adjacent symbols of Transaction Watermarks and occupy substantial portions of the host content, however, they do not contain transactional information. The forensic marking techniques described in accordance with the various embodiments of the present invention similarly provide for the embedding of forensic watermarks into a content that is in compressed format but they eliminate the need for Common Watermark intervals, thus improving the density of Transaction Watermark symbols, and efficiency of forensic marking. These and other features of the various embodiments of the present invention are achieved while avoiding perceptual artifacts beyond those inherent to the watermarking technology itself.

Furthermore, while the U.S. Pat. No. 6,430,301 discloses a technique that allows identifying multiple offending parties involved in a collusion attack, it doesn't thwart the threat of a differential analysis attack. Such an attack may reveal information regarding the deployed watermarking technology and may lead to the design of attacks that destroy (e.g., erase or jam) the embedded watermarks. The forensic marking techniques described in accordance with the various embodiments of the present invention have the further advantage of obstructing an attacker's attempts to reverse engineer the deployed watermarking technology, thus thwarting potential differential analysis attack.

FIG. 1 illustrates a block diagram for embedding forensic marks in a host content 41 in accordance with an example embodiment of the present invention. The forensic marking system 10 includes a preprocessing module 12, a marking module 14 and a database 16. The preprocessing stage, which typically comprises computationally expensive operations such as watermark embedding and compression, may be carried out at a different time, and/or at a different location, than the marking stage. The preprocessing module 12 comprises one or more embedder modules 18 to 22 that embed a host signal 41 with a plurality of marks. Each embedder 18 to 22 embeds a distinct string of symbols in the host content 41. For example, a first embedder 18 may embed a first logical value, while a second embedder 20 may embed a second logical value in the host content 41 to produce two different versions of the host content. Note that some symbols may be the same in the different versions of the embedded host content (e.g. headers), and one version of the embedded host content may comprise a first string of symbols, for example, the binary pattern "0101 . . . " while another may comprise, for example, the binary string "1010 . . . " It should be noted that while the example embodiment of the present invention as shown in FIG. 1 illustrates separate embedders 18 to 22 that are deployed in parallel for embedding each distinct watermark symbol, a single embedder module may be used to embed all symbols, for example, in a serial fashion. Alternatively, the embedding of the plurality of symbols may be carried out by separate embedders that share one or more components or modules.

It should also be noted that the embedding of the different symbols may, but is not required to, be conducted using the same embedding technology or algorithm. Thus, for example, a first symbol may be embedded using a first watermarking technology while a second symbol may be embedded using a second embedding technology. However, the important restriction is that all watermark symbols use the same symbol interval, and be embedded synchronously within the host content 41. As a result, the outputs of embedders 18 to 22 comprise different versions of a host content, which although perceptually similar, comprise different embedded watermarks. The term "symbol interval" is generically used herein to refer to the extent of a host content that is used to carry an individual watermark symbol. For example, when embedding a one dimensional host content, such as an audio signal, a symbol interval may correspond to the duration of the host content that accommodates the embedding of a watermark symbol. Analogously, when embedding a two dimensional host content, such as a still image, a symbol interval may correspond to the spatial extent of the host content that accommodates the embedding of a watermark symbol. For a multi-dimensional host content, such as a video signal, a symbol interval may comprise a temporal, spatial, or combination of temporal and spatial, extent of the host content that accommodates the embedding of a watermark symbol. Furthermore, a symbol interval may comprise an extent of a host content that can accommodate the embedding of a watermark symbol in a different domain, such as in frequency domain.

Referring back to FIG. 1, after embedding of the host content 41 with a plurality of watermark symbols, the different versions of marked host content are compressed by compressors 24 to 28 using one or more perceptual compression techniques, such as MPEG, JPEG, and the like. The compressed content may then be saved in a storage unit 32 that comprises, for example, one or more hard disks, RAMs, optical disks, flash memory devices, and the like. In addition, the un-marked host content 41 may optionally be compressed in compressor 30, and saved in the storage unit 32, as well. It should be noted that while the example embodiment of the present invention as shown in FIG. 1 illustrates separate compressors 24 to 30 that are deployed in parallel for embedding different versions of the host content, a single compressor 24 may be used for compression the different versions of the host content, for example, in a serial fashion. Alternatively, the different versions of the host content may be compressed using separate compressors that share one or more components or modules. The term "tributary" is used herein to refer to the different versions of the host content that have been compressed and are made available to the marking module 14. It should be noted that while the exemplary embodiment of the present invention as shown in FIG. 1 illustrates a memory unit 32 that is located within the preprocessing module, such memory unit 32 may reside outside of the preprocessing module 12. Furthermore, in an example embodiment of the present invention, the need for a permanent storage unit may be eliminated by saving the tributaries in temporary storage, such as in RAM, or run-time memory. This configuration may be used, for example, for a one-time generation of a number of forensically marked content that are distributed to content reviewers.

In accordance with an example embodiment of the present invention, at the end of the preprocessing stage, at least two distinct versions of the host content that are at least partially overlapping are produced. For example, at the end of the preprocessing stage, the storage unit 32 may contain a complete compressed copy of the unmarked content together with a partial copy of the host content that is marked by a first embedder 18. Alternatively, the storage unit 32 may contain two full copies of the host content, one marked by a first embedder 18, and the other marked by a second embedder 20, but without a compressed version of the unmarked host content. Note that marked and unmarked versions of the host content are perceptually similar, and thus either version, or a composite version that is produced by splicing different segments of each version, may be presented to the user. The particular selection of candidate segments from the plurality tributaries forms the basis of forensic marking in accordance with the various embodiments of the present invention. For example, with only two distinct versions of the host content at the output of the preprocessing stage, the marking module 14 can create a marked content 40 that comprises binary watermark symbols. However, if M distinct tributaries are created by the pre-processing module 12, each comprising a different watermark symbol, the marking module 14 can generate a marked content 40 with M-ary watermark symbols.

Figure 3:
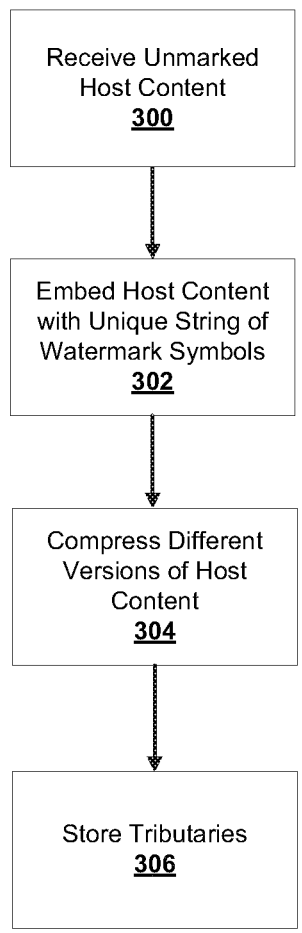
FIG. 3 illustrates a block diagram for preprocessing operations in accordance with an example embodiment of the present invention.

The preprocessing operations in accordance with an example embodiment of the present invention is further described in the flow diagram of FIG. 3. In Step 300, a host content is received at the preprocessing module. In Step 302, the received host content is embedded with one or more strings of watermark symbols to create different versions of the embedded host content. Note that some embedded symbols in the different versions of the embedded host content may be the same among different copies, yet the overall string of embedded symbols may be unique for each version. In Step 304, the different versions of the embedded host content, including the unmarked host content, are compressed to form a plurality of tributaries. Finally, in Step 306, the plurality of tributaries are stored in a storage unit that is accessible to the marking module.

Referring back to FIG. 1, the marking module 14 is responsible for creating forensically marked content 40 in compressed domain using relatively inexpensive operations. This task may be accomplished by combining portions of two or more tributaries using a multiplexer (MUX) 34. In one example embodiment, the generation of the forensically marked content 40 may be initiated as a single transaction, for example, upon a user's request to purchase a content, while in a different example embodiment, the marking may be initiated by a batch process that results in the creation of a plurality of uniquely marked content for subsequent distribution. In either example embodiment, the marking request is associated with transaction metadata 38 that describes the details of transaction, such as the intended destination of the marked content, time, date and source of the request, or other information that uniquely identifies the transaction. Each request for the creation of a marked content 40 may trigger the generation of a unique code in Code Generator 36. This code that is ultimately embedded in the marked content 40, is also saved in database 16, along with the associated transaction metadata 38. The database 16 may later be used to link the codes that are extracted from a marked content to the transaction that caused the creation of that particular content. It should be noted that the marked content may alternatively, or additionally, be viewed and/or transmitted to a remote location for viewing. For example, the marked content may be viewed in real time subsequent to, or during, the forensic marking process. The forensically marked content may also be saved on different kinds of computer readable media, including, but not limited to, DVDs, CDs, Flash memory devices and the like.

Figure 2:
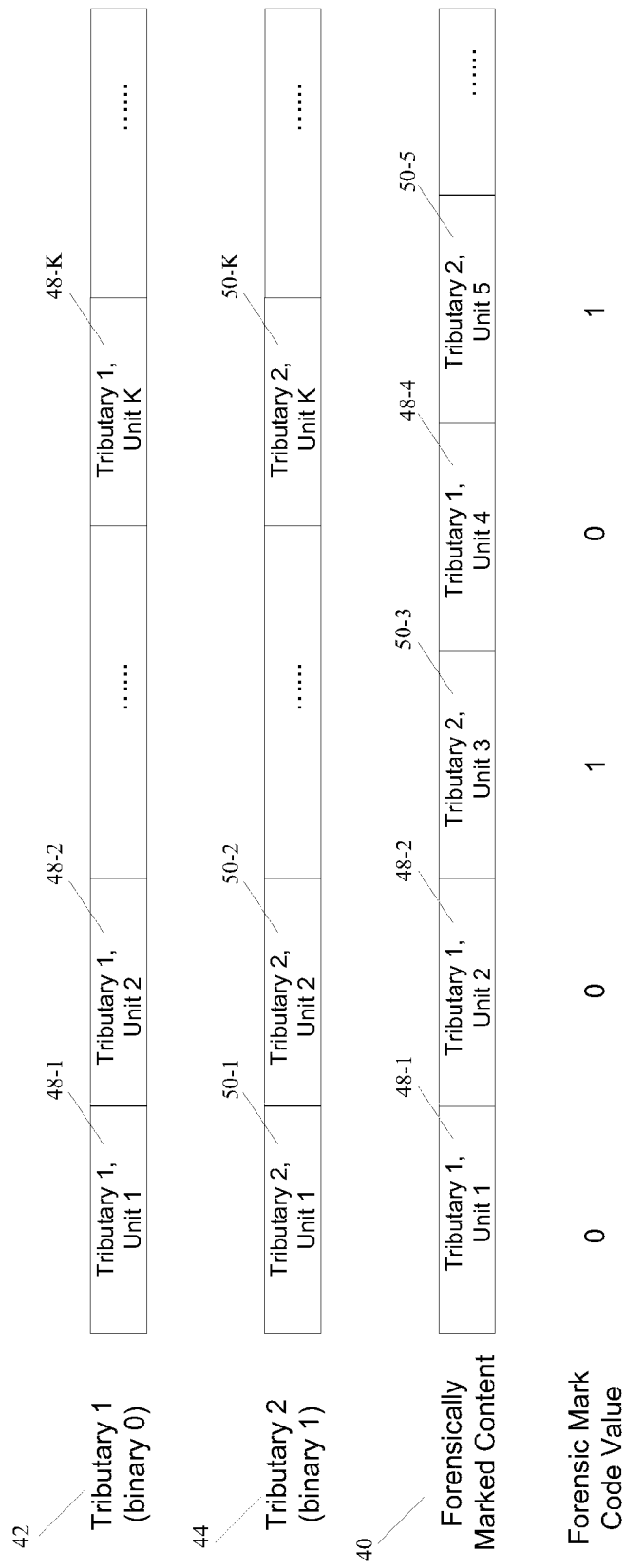
FIG. 2 illustrates the formation of forensically marked content in accordance with an example embodiment of the present invention.

The code generated by the code generator 36 controls the operation of the MUX 34, and governs the selection of content segments from different tributaries. It should be noted that the MUX 34 has access to some or all of the tributaries. As such, the MUX may select the appropriate tributaries from the available tributaries. Alternatively, or additionally, the MUX may request and receive the desired tributaries, or portions thereof, from one or more entities that have access to and/or contain the tributaries. Further, the MUX 34 may comprise various components and subcomponents that allow the selection, retrieval, and assembly of a plurality of content segments. For example, the MUX may be equipped with a processor, memory, and communication ports that allow the implementation and execution of the various data manipulations, as well as data and command input/output operations. To this end, the MUX 34 may be implemented as software, hardware, firmware or combinations thereof. The operation of the MUX 34 may be further illustrated using an example embodiment of the present invention depicted in FIG. 2, in which two one-dimensional tributaries are available for marking a host content using binary watermark symbols. In the example embodiment of FIG. 2, a first tributary 42 may correspond to a compressed version of a host content that is embedded repeatedly and consecutively with all-zero watermark symbols, and a second tributary 44 may correspond to a compressed version of a host content that is embedded repeatedly and consecutively with all-one watermark symbols. Generally, perceptual compression algorithms, such as MPEG or JPEG, divide the host content into compression units or frames, where each compression unit is independently processed and stored. The compression units 48-1, 48-2, . . . , 48-K corresponding to the first tributary 42, and the compression units 50-1, 50-2, . . . , 50-K corresponding to the second tributary 44 are illustrated in FIG. 2. Once a transaction request is initiated, the code generator 36 generates a unique transaction code in accordance with the transaction metadata 38 associated with the transaction request. For example, the code generator 36 may generate a binary code "00101" associated with a particular request. The MUX 34 then selects the appropriate compression units from tributaries according to the code provided by the code generator 36, and assembles the marked content 40 as concatenations of the various segments of the two tributaries. This technique is often referred to as a cut-and-splice procedure.

The cut-and-splice procedure for forming the forensically marked content 40 corresponding to the exemplary binary code "00101" involves selecting the first compression unit 48-1 from the first tributary 42, the second compression unit 48-2 from the first tributary 42, the third compression unit 50-3 from the second tributary 44, the fourth compression unit 48-4 from the first tributary, and the fifth compression unit 50-5 from the second tributary 44. The forensically marked content 40 may be produced by back-to-back concatenation of the above noted compression units.

Note that each compression unit should contain information that can be independently interpreted by the matching perceptual decoder to reconstruct the host content. Moreover, the length of the watermark symbol interval should be equal to the length of one or more compression units. That is, a watermark symbol interval may span an integer multiple number of compression units. Additionally, a symbol boundary may substantially match the boundary of a compression unit (or an integer number of compression units). For instance, the example embodiment of FIG. 2 illustrates the case where the bit interval matches the length of one compression unit. Although the above example embodiment have been described using a binary watermarking alphabet, those skilled in the art can readily generalize this procedure to deliver M tributaries to the marking module 14, generate M-ary codes using the code generator 36, and assemble a forensically marked content with M-ary symbols using the MUX.

In accordance with another example embodiment, only portions of the content may be marked using the above described cut-and-splice technique. In such an example embodiment, the forensically marked content may comprise unmarked sections that are selected from the unmarked tributary (i.e., the output of compressor 30). The unmarked segments of the content may be used, for example, to embed another forensic mark at a different node within the sales/distribution chain of the content.

Figure 4:
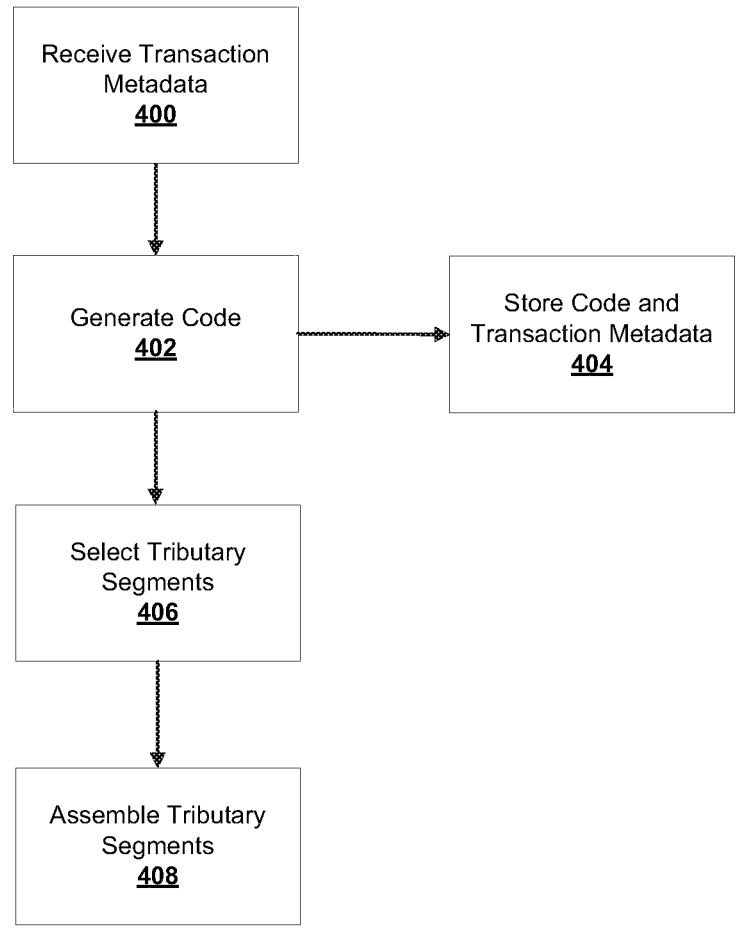
FIG. 4 illustrates a block diagram for marking operations in accordance with an example embodiment of the present invention.

FIG. 4 illustrates the marking operations in accordance with an example embodiment of the present invention. Once a request for a particular host content is submitted, the transaction metadata associated with that request is received by the marking module in Step 400. In Step 402, a unique code associated with the received transaction metadata is generated, and in Step 404, this code, along with the appropriate transaction metadata is stored in one or more databases. In Step 406, segments of different tributaries associated with the requested host content are selected in accordance with the generated code. In Step 408, the marked content is generated by back-to-back concatenation of the tributary segments in accordance with the particular order that corresponds to the generated code.

The above-described cut-and-splice procedure may be adapted to operate with different perceptual compression technologies that utilize compression units of different size. This approach requires more flexibility in selecting and designing the particular parameters associated with watermark embedding technologies. For example, different watermark symbol intervals may need to be selected for Advanced Audio Coding (AAC) audio compression as opposed to MPEG audio compression algorithm. However, this is not a significant restriction since the list of candidate compression technologies is finite. Thus, a set of watermarking parameters that are suitable for use with the most commonly used (or even with an exhaustive list of) compression technologies can be created. Once a compression technology for compression of the host content is selected, the marking of different symbols at the preprocessing stage can be readily conducted in accordance with the watermarking parameters that are suited for that particular compression technology. The extraction of the embedded forensic marks can be similarly conducted using the above-noted list of watermarking parameters. If the content is still in compressed format (or the compression technology is otherwise known), the appropriate watermark parameters associated with that compression technology can be retrieved and used for extracting the embedded watermarks. If the content is not in compressed format (and the compression technology is not otherwise known), watermark extraction may be conducted by selecting candidate watermark parameters, one at a time, in multiple attempts to extract the embedded forensic marks. However, since the code extraction is likely to be conducted in a forensic environment, watermark parameters for a particular content is likely to be known prior to the extraction process (e.g., stored in a database along with transaction metadata). For example, a music track that is released by a certain music studio is likely to be released in only one or two different compressed formats. Accordingly, when such a music track is discovered in a piracy network, watermark parameters associated with one or two candidate compression technologies are merely needed to successfully extract the embedded watermarks.

By the way of example, and not by limitation, the following provides an detailed example of how watermarking parameters may be adjusted for use with a particular perceptual compression technology. In accordance with this example embodiment, audio watermarking parameters are tailored to be used with AAC compression technology. In AAC, as in most other audio compression technologies, time domain audio samples are first transformed to frequency domain samples. The transformation used in AAC is Modified Discrete Cosine Transform (MDCT) with 50% windowed overlap. The compressed bitstream contains all information needed to reconstruct the spectrum. Frequency domain values in each bitstream unit are independent from those of other units. Note that, with AAC, this occurs when the inter-frame prediction is disabled (prediction can be inter-frame or intra-frame, i.e., between adjacent frames or within one frame). In order to reconstruct the time domain audio samples, an Inverse Modified Discrete Cosine Transform (IMDCT) is performed with 50% windowed overlap. Details of AAC compression and decompression algorithms may be found in various references, for example, in "Dai Tracy Yang, Chris Kyriakakis, and C.-C. Jay Kuo, "High Fidelity Multichannel Audio Coding", EURASIP book series on Signal Processing and Communications, 2004." FIG. 5 illustrates an example string of overlapping windows 60 for compression units with matching watermarking bits.

Figure 5:
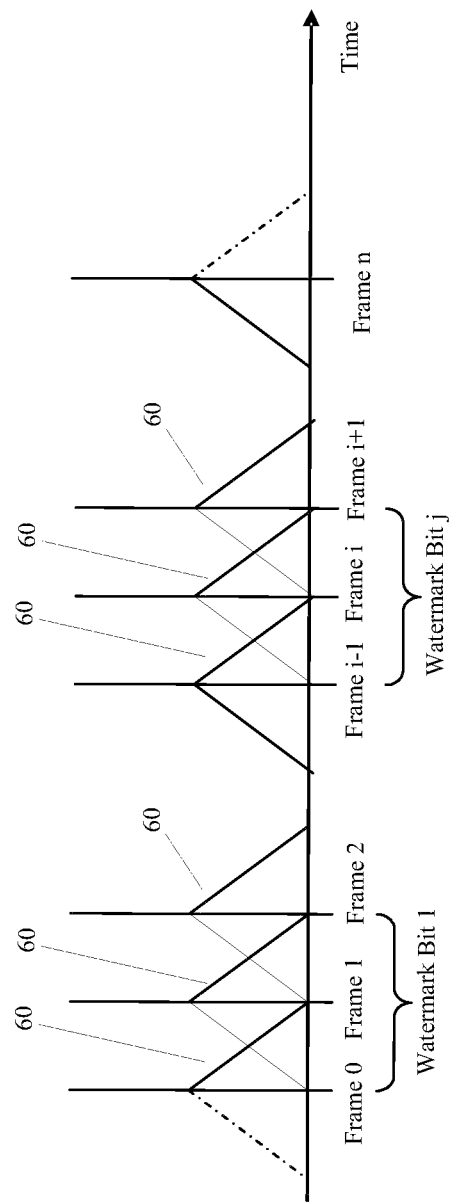
FIG. 5 illustrates a forensically marked content in accordance with an example embodiment of the present invention.

Note that in the example embodiment of FIG. 5, two compression units (or frames) are used for embedding one watermark bit. More specifically, in AAC compression, each frame comprises exactly 2048 samples converted into MDCT domain, but in accordance with an example embodiment of the present invention, the start of each frame is shifted by 1024 samples in order to create a 50% overlap. Each frame is 2048 samples, but with 50% overlap, the next frame starts 1024 samples after the start of the current frame. By having a bit interval with 2048 samples, each watermark bit may be selected to span two consecutive frames of a tributary. This way, the middle 1024 samples, where the two frames overlap, carry the undisturbed watermark symbol. On each side, of the undisturbed portion, there are 1024-sample tails that transition into the adjacent bit intervals. Due to the window shape, the watermark bit is dominant in half of the tail on each side of the 1024-sample undisturbed portion, making each bit interval 1024+2*512=2048 samples long. Using this technique, up to 1024 samples of each bit interval may produce interference with the adjacent bit intervals if the adjacent bits are selected from different tributaries. However, if adjacent bits are selected from the same tributary as the current bit tributary, the overlapping bit segments do not produce any interference. In the example case where an audio sampling rate of 44.1 kHz is used, the watermarking bit rate of the forensic mark is 44100/2048=21.533 bits per second.

Referring back to FIG. 1, the MUX 34 selects the appropriate frames from the tributaries in accordance with the code generated by the code generator 36. Transition from one tributary to another takes place when there is a transition in the generated code from one symbol to another. This transition does not produce noticeable artifacts as long as the tributaries are perceptually similar, and the window shapes associated with the compression technologies of all tributaries are substantially similar to each other. However, if the window shapes are appreciably different, it is possible to create perceptible artifacts at symbol transition points within the marked content.

Figure 6:
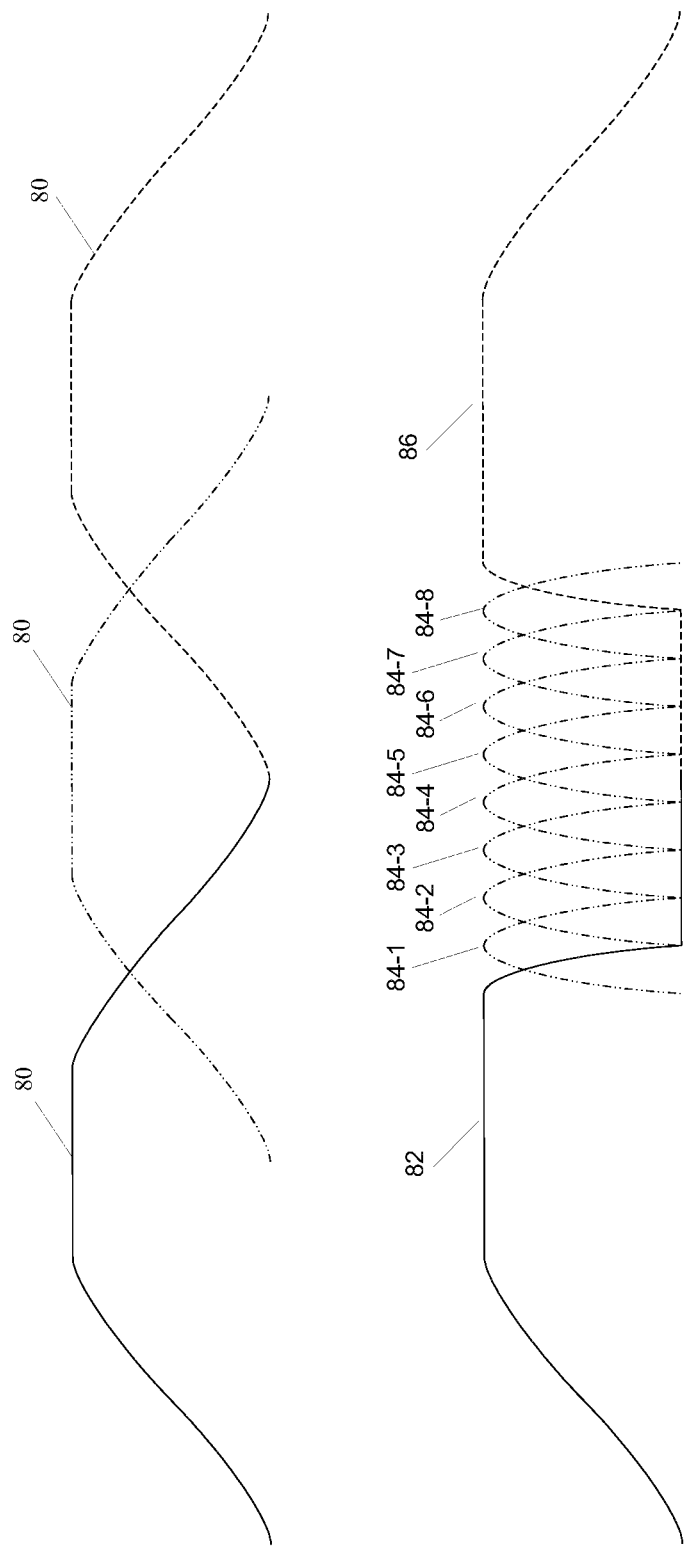
FIG. 6 illustrates example window shapes in Advanced Audio Coding (AAC) compression algorithm.

In accordance with another example embodiment of the present invention, these perceptible artifacts may be avoided even if the window shapes are not the same. FIG. 6 illustrates the various window shapes that are utilized in the AAC compression algorithm. The top portion of FIG. 6 contains a sequence of the so-called long windows 80. The long windows 80 provide good audio quality for slowly changing audio signals, such as tonal music. However, in the presence of fast changing audio signals, such as a percussion attack, the long windows 80 may introduce undesirable effects of a pre-echo in the audio signal. In this case, a better audio quality is achieved by using the so-called short windows 84-1 to 84-8 that are shown in FIG. 6. The AAC compressor is capable of automatically detecting audio attacks and changing the window shape from long to short, as needed, to provide the desirable audio quality. Note that one compression unit (or frame) carries data that is associated with one long window, or eight short windows. In order to smooth the transition points from a long to a short window, and from a short to a long window, and to avoid audible artifacts, the AAC algorithm introduces two additional windows: a long-start window 82, and a long-stop window 86, as also illustrated in FIG. 6. In AAC, the criterion for design of the transition window is that the squared sum of the first half of the window and the second half of the window should equal to one. Therefore, if a short window is required after several long windows, then the last window before the start of the short window should be a long start window. Similarly, when short window is followed by a long window, the first window after the short window should be a long stop window.

When AAC audio compression is used to carry out forensic marking according to the various embodiments of the present invention, the transition points from one tributary to another may trigger the selection of a different window type. Typically different tributaries that are created in accordance with the various embodiments of the present invention are perceptually similar. Therefore, the AAC window selection mechanism is likely to detect audio attacks (and switch to short windows) at the same locations within the compression frames of all tributaries. However, occasionally the AAC compressor may select different window types for different tributaries. This disparity of window selection between the different tributaries may create audible artifacts in the forensically marked content. For example, the transition from a tributary frame with a long window to another tributary with a short window, without the intermediate long-start window, may create an audible artifact in the output audio stream since such transition violates the window transition criterion discussed above. One example scenario may involve the case where the percussion attack in the second tributary is detected slightly earlier than in the first tributary, and as a result the position of the short windows are shifted by one frame. So, for example, the first tributary may comprise the following sequence of windows: long, long-start, short, long-stop, while the second tributary may comprise the following sequence: long-start, short, long-stop, long. If now the embedding of the forensic marks necessitates a transition from the first tributary to a second tributary between the first and the second unit of the sequence of windows, the resulting window sequence will be long, short, long-stop, long, which can potentially produce an audio artifact in the middle of the window sequence.

Figure 7:
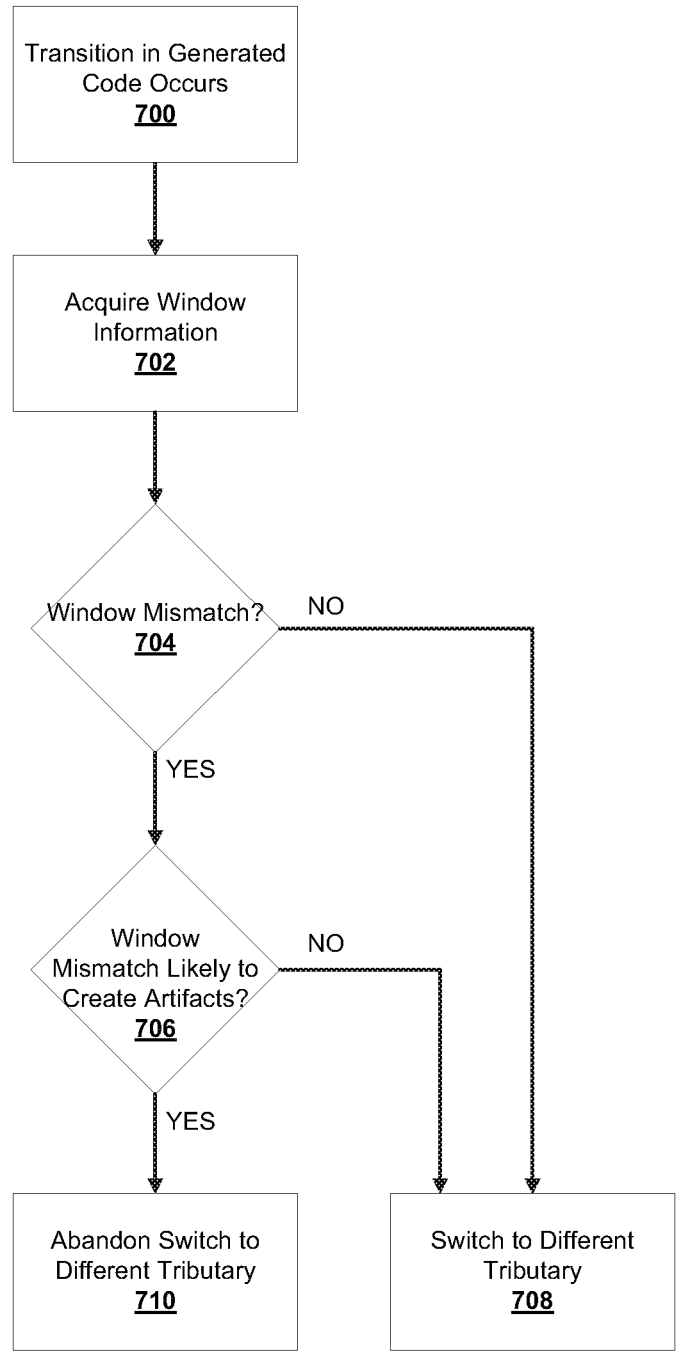
FIG. 7 illustrates a flow diagram for switch inhibit operation in accordance with an example embodiment of the present invention.

In order to avoid such perceptible artifacts, the MUX 34 of FIG. 1, in accordance with an example embodiment of the present invention, may be configured to receive information regarding the various window shapes that are employed in frames of different tributaries, whenever a switch between different tributaries is mandated by the generated code. In this example embodiment, if the MUX 34 detects a window mismatch between the tributary frames, switching to the new tributary may be inhibited by asserting a "switch abandon" action. The switch abandon, when asserted, effectively introduces a symbol error in the embedded forensic marks that are embedded in the host content. FIG. 7 illustrates a block diagram of the different steps involved in determination of a switch abandon assertion. The process starts in Step 700 of FIG. 7 when a transition in the generated forensic mark code value is detected. In Step 702, information regarding the window utilized by the compressor for at least the tributary corresponding to the new symbol value is retrieved. The window information, such as window shape information, is compared to the window information corresponding to the currently used tributary in Step 704. If the window information is the same, switching to the tributary that corresponds to the new symbol value is permitted in Step 708. If the window information is not the same, it is determined, in Step 706, whether or not switching to a different tributary results in perceptible artifacts. For example, if the switching occurs from one tributary having long and long windows, to another tributary with long and long-start windows, there is no need to hold switching, since at the transition moment, long and long-start windows have the same tails. Furthermore, if the transition region coincides with a "silent" portion of the audio content, switching to a different tributary with a different window shape may not produce perceptible artifacts. When no perceptible artifacts are produced, switching to a different tributary is permitted in Step 708. If switching produces perceptible artifacts, the switching may be abandoned in Step 710. As a result of Step 710, the use of the current tributary persists until switching to a new tributary is initiated by another transition in the code value.

According to the experimental results conducted for audio signals, bit errors introduced as a result of abandon switch assertions are fairly rare, and can be corrected by error correction codes that are normally used in the formation of watermark bit streams. Alternatively, or additionally, bit error locations due to switch abandon assertions can be saved in a database that is accessible to the forensic mark extractor. This information can be used during the extraction process to identify and correct these bit errors.

The abandon switch may be asserted whenever the concatenation of content segments from different tributaries is likely to create perceptible artifacts. As such, the abandon switch may be asserted not only when window shapes differ (e.g., a mismatch between long and short windows), but also when different types of windows are used. For example, an abandon switch action may be asserted when one tributary is using a Kaiser-Bessel Derived (KBD) window, while the other tributary is using a Sine window. Experimental results on audio signals have confirmed that the number of switch abandon instances depend strongly on the type of perceptual compressor and the operation mode selection used in a particular application. Note that AAC compressor may allow the use of a mixture of KBD and Sine window types, or the use Sine windows only. Since some perceptual compressors do not use Kaiser-Bessel Derived windows at all, the mismatch with Sine window is avoided altogether when such compressors are utilized. Accordingly, if there is some flexibility in selecting a perceptual compressor, it may be advantageous to test multiple compressor candidates to determine which compressor is likely to produce the minimum number, and density, of switch abandon events.

In the case of a multi-channel content (such as a multi-channel audio content), each channel may be embedded independently, but synchronously, with the same forensic mark. However, in such cases, it may be possible that abandon switch action is asserted in some, but not all, of the channels.

This is an undesirable situation since it may lead to the embedding of different symbols in different channels, which may cause audio artifacts. For example, such a mismatch in the embedding of the left and right channels of a stereo signal may cause a shift in space of the sound source, which may or may not result in a significant audio artifact. Furthermore, if an attacker attempts to use a channel mixdown attack (i.e., when two or more channels are mixed into a single channel) to weaken or remove the embedded watermarks, the differing symbols embedded in the corresponding locations of the different channels are likely to interfere with each other. Therefore, in accordance with an example embodiment of the present invention, the assertion of an abandon switch action in one channel may automatically trigger an abandon switch assertion in all other channels at the same content location. Additionally, or alternatively, many perceptual compressors may be configurable to use the same set of compression parameters, such as window shapes, for all channels. By selecting this configuration option, the number and density of abandon switch activations may be further reduced.

The procedures described above in connection with AAC compression algorithm can be readily applicable to other compression techniques. For example, MPEG-1, 2 and 4 audio compression techniques all use a similar frame structure. In particular, while the frame size of AAC compression is 1024 samples, AACplus frames contain 2048 samples, and MP3 frames contain 1152 samples. Many popular speech codecs, such as CELP, EVRC, AMR, and the like, also use a frame-based compression architecture (e.g., the general frame size is 20 ms), and therefore can be readily adapted for forensic marking in accordance with the various embodiments of the present invention. Typical image and video compression techniques are also similarly designed in accordance with fixed block-size architectures. For example, JPEG compression technique is based on 8×8 DCT transform blocks, which may be treated as one compression unit. JPEG2000 uses wavelet transforms, which are not block based in time domain However, it is still possible to carryout similar cut-and-splice operations in a compressed transformed domain to apply the forensic marks in accordance with the various embodiments of the present invention to JPEG2000 content. Forensic marking techniques in accordance with the various embodiments of the present invention may also be readily adapted for use with video compression techniques. For example, in MPEG compression algorithm, a video stream is comprised of three different Intra-coded (I), Bi-directional (B), and Predicted (P) frames. P and B frames are predicted from other frames. But I frames are independently compressed and decompressed, and thus can be treated as independent units (or as a still image with multiple independent units) for the purposes of forensic marking in accordance with the various embodiments of the present invention.

Differential Analysis Obstruction

An attacker may attempt to defeat a forensic watermarking system by obtaining two or more copies of the same content marked by distinct forensic marks. By subtracting one copy from the other, the attacker may find content locations that carry different forensic symbols, and obtain the difference between the embedded symbols. By analyzing this difference signal, an attacker may be able to reverse engineer the watermarking technology and find the secret information (i.e., the stego key) used for embedding the forensic marks. Using this information, the attacker may be able to further devise attacks to remove, jam, or even forge the embedded watermarks. In accordance with example embodiments of the present invention, differential analysis attacks on forensically marked content may be thwarted. The disclosed methods may be used separately, or in combination with each other, to obstruct the differential analysis of forensically marked contents.

In accordance with one example embodiment, one or more signal distortions may be introduced in different tributaries during the preprocessing stage. These distortions, which do not convey any watermark information, must be different in each tributary, and at the same time, must be perceptually insignificant. The introduced distortions effectively mask the presence of the embedded watermarks. An attacker is then faced with the challenge of distinguishing between the components of the difference signal that are truly related to the watermark technology and those that are merely due to the introduced distortion. By the way of example, and not by limitation, non-linear amplitude modification of the content is one such distortion that may be introduced as part of each embedder 18 to 22 functionality in FIG. 1. This distortion may be applied, for example, to each version of the host content, either before or after embedding of the symbol values. This technique produces different distortions in each tributary but has insignificant impact on the embedded host quality.

Figure 8A:
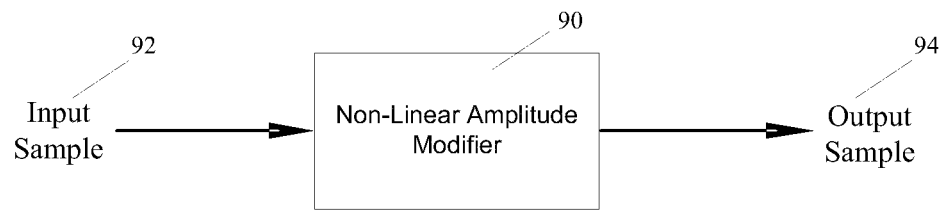
FIG. 8(A) illustrates a non-linear amplitude modifier in accordance with an example embodiment of the present invention.
Figure 8B:
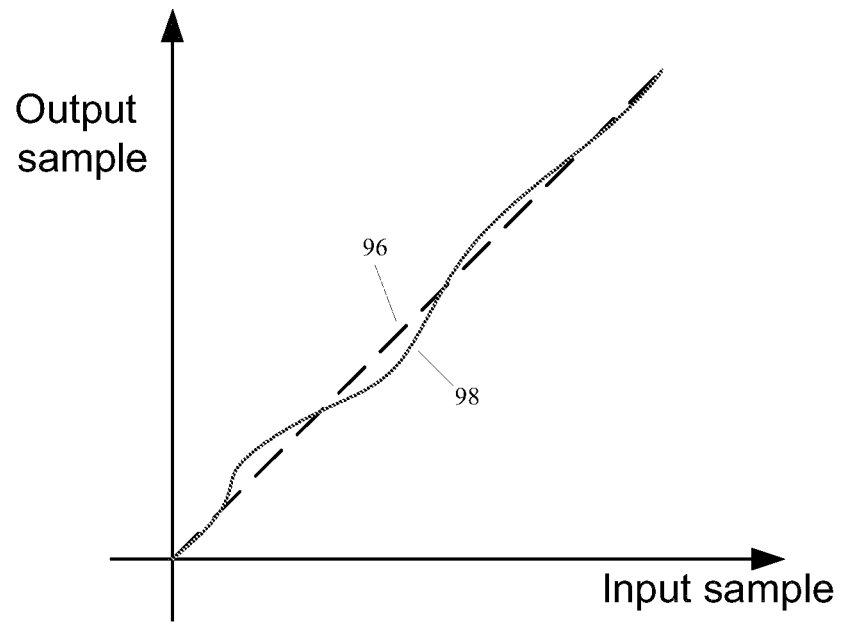
FIG. 8(B) illustrates an example characteristic plot of the non-linear amplitude modifier of FIG. 8(A).

FIG. 8(A) shows an example embodiment of the present invention illustrating the application of nonlinear amplitude modification to input samples of a host content. In FIG. 8(A), each input sample 92 of a host content is modified by the non-linear amplitude modifier 90 to produce an output sample 94. FIG. 8(B) illustrates an example plot in the form of an input—output sample characteristic deviating from a straight line that is associated with the non-linear modifier 90 of FIG. 8(A). The straight line 96 is produced when the input and output samples are equal. When non-linear amplitude modification is applied, the output samples deviate from the input samples as illustrated by the characteristic (curved) line 98 of FIG. 8(B). In order to thwart differential analysis of the embedded content, a different characteristic line must be produced for each version of the host content that is subjected to non-linear amplitude modification. However, it is also desirable to make the variations due to non-linear amplitude modification to change slowly and randomly with time to make reverse engineering of the applied distortion more difficult.

Another candidate distortion for thwarting differential analysis is the introduction of random phase offsets into the host content that is disclosed in the commonly owned U.S. Pat. No. 6,145,081. This distortion may be applied independently to each version of the host content as part of the embedder 18 to 22 functionality. Similar to the above-described non-linear amplitude modification, the introduction of random phase offsets does not produce perceptible artifacts but creates a large difference between the different versions of the host content. This large difference obstructs differential analysis of the content that may be conducted by an attacker to gain insights into the watermarking technology. Note that the technique disclosed in U.S. Pat. No. 6,145,081 introduces a different phase offset into each copy (not tributary) of the fully embedded host content, with the objective to produce annoying artifacts when averaging or splicing attacks are used. In accordance with the example embodiments of the present invention, however, each tributary is subjected to a random phase offset. Accordingly, a forensically marked content may comprise a plurality of sections, where each section has undergone a different random phase modification. Therefore, an attacker is faced with the challenge of defeating a plurality of phase offset distortions.

In accordance with another embodiment of the present invention, differential attack obstruction may be effected by using two or more distinct watermarking technologies for embedding the same symbol in the same compression unit(s). This way, an attacker is further frustrated by facing the challenge of determining which of the plurality of features of the difference signal is associated with a particular embedding technology.

In accordance with another embodiment of the present invention, differential analysis obstruction through the introduction of host signal variations may be implemented at the marking stage, after the multiplexing. In devising different techniques to obscure differential analysis of embedded content, the objective is to increase the difference between distinct copies of the marked content by manipulating parameters of compressed domain stream differently for each copy. In accordance with another example embodiment of the present invention, this task may be accomplished in an AAC compressor by introducing small, random amplitude modifications using AAC Fill elements, without introducing noticeable audio artifacts. This process doesn't require decompression of the host content, and thus is computationally inexpensive. At the same time, it effectively masks the watermark features that may be otherwise detectable in the difference signal. Furthermore, the random nature of modifications makes it difficult to reverse engineer the obstruction methodology.

In one example embodiment, changing the Dynamic Range Control (DRC) in the Fill element of a compressed AAC bitstream may effect masking of the watermark symbols. Note that DRC is part of the regular bitstream for each frame and is used by the AAC decompressor to produce de-compressed audio samples with a proper dynamic range. With DRC bits enabled, the final decompressed audio content is produced according to Equation (1):

$$\text{sound\_data}' = \text{sound\_data} * \Delta \quad (1)$$

where sound_data' represents the decompressed audio samples after applying DRC, sound_data represents the decompressed audio samples before applying DRC, and $\Delta$ is a factor (i.e., a number) that is calculated from the DRC bits in order to produce decompressed audio samples with a proper dynamic range. A detailed description of the various DRC data elements may be found, for example, in "International Organisation For Standardisation Organisation Internationale De Normalisation ISO/IEC JTC1/SC29/WG11 Coding Of Moving Pictures And Audio, MPEG-4 Audio." Note that the absence of DRC bits in the bitstream (i.e., the DRC signaling bit is 0) may be treated as having a $\Delta$ value of 1. The value of $\Delta$ can be changed from one compression frame to another, or even from one sub-frame to another sub-frame, depending on the bit information in the DRC bitstream. The higher the number of the sub-frames, the more bits are inserted in the DRC portion of the bitstream. In accordance with an example embodiment of the present invention, in order to obstruct differential analysis of a decompressed content, the value of $\Delta$ associated with each tributary may be varied from its original value by a small amount in order to effect random amplitude modifications in the decompressed audio samples. Since $\Delta$ is calculated from the DRC bits of the compressed bitstream, by changing and/or inserting a few bits into the DRC portion of each compressed tributary, the final value of the decompressed audio samples may be changed. Since a compressed AAC tributary may not have any DRC bits (i.e., DRC signaling bit is 0), DRC bits may be added to the compressed bitstream in accordance with another example embodiment of the present invention. For example, at least 39 bits per frame may be added to a compressed AAC bitstream to allow the extraction of a $\Delta$ value from the compressed bit stream (while setting the DRC signaling bit to 1).

Note that the addition of such additional bits (e.g., 39 bits) only amounts to about one percent increase in the total number of bits in a frame. If the DRC bits are already present in the bitstream, the modification of these bits to produce a different $\Delta$ value, in accordance to the example embodiments of the present invention, may or may not result in an increase in the total number of bits per frame. Any increase, however, is likely to be very small.

It is understood that the various embodiments of the present invention may be implemented individually, or collectively, in devices comprised of various hardware and/or software modules and components. These devices, for example, may comprise a processor, a memory unit, an interface that are communicatively connected to each other, and may range from desktop and/or laptop computers, to consumer electronic devices such as media players, mobile devices and the like. For example, referring back to FIG. 1, the Preprocessing and Marking modules may be implemented in software, hardware, firmware, or combinations thereof. Similarly, the various components or sub-components within each module may be implemented in software, hardware, firmware. The connectivity between the modules and/or components within the modules may be provided using any one of the connectivity methods and media that is known in the art, including, but not limited to, communications over the Internet, wired, or wireless networks using the appropriate protocols.

Various embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

The foregoing description of embodiments has been presented for purposes of illustration and description. The foregoing description is not intended to be exhaustive or to limit embodiments of the present invention to the precise form disclosed, and modifications and variations are possible in light of the above teachings or may be acquired from practice of various embodiments. The embodiments discussed herein were chosen and described in order to explain the principles and the nature of various embodiments and its practical application to enable one skilled in the art to utilize the present invention in various embodiments and with various modifications as are suited to the particular use contemplated. The features of the embodiments described herein may be combined in all possible combinations of methods, apparatus, modules, systems, and computer program products.

What is claimed is:

1. A method, comprising:
   selecting a watermark symbol interval for embedding watermark symbols within a host content, wherein the watermark symbol interval spans an integer multiple of compression units of a particular compression algorithm;

obtaining at least a portion of the host content in uncompressed format;

producing a first tributary by embedding a first watermark symbol in at least one watermark symbol interval within the uncompressed host content and compressing at least the embedded portions of the host content thereafter using the particular compression algorithm; and making the first tributary and at least a second tributary available to one of a content handling device or a computer readable storage medium for production of a marked host content.

2. The method of claim 1, wherein the particular compression algorithm is selected from a group of compression algorithms consisting of: AAC, AACplus, MP3, JPEG, JPEG2000 and MPEG.

3. The method of claim 1, wherein the host content is one of: a still image, a video content or an audio content.

4. The method of claim 1, wherein the watermark symbol interval corresponds to one or more of:
a duration of the host content in uncompressed format;
a spatial extent of the host content in uncompressed format;
a combination of spatial and temporal extent of the host content in uncompressed format; or
an extent of the host content in a frequency domain in uncompressed format.

5. The method of claim 1, wherein the second tributary is an unmarked version of the host content in compressed format.

6. The method of claim 1, wherein at least a portion of the second tributary comprises a second watermark symbol, and the second tributary is produced by embedding the second watermark symbol in the at least one watermark symbol interval within the uncompressed host content and compressing at least the portions of the host content embedded with the second watermark symbol thereafter using the particular compression algorithm.

7. The method of claim 6, comprising:
making a third tributary available to the to one of a content handling device and a computer readable storage medium, wherein at least a portion of the third tributary comprises a third watermark symbol, and the third tributary is produced by embedding the third watermark symbol in the at least one watermark symbol interval within the uncompressed host content and compressing the at least portions of the host content embedded with the third watermark symbol thereafter using the particular compression algorithm.

8. The method of claim 1, wherein corresponding portions of each of the first and at least the second tributary are perceptually similar.

9. The method of claim 1, wherein one or more of the first tributary or the at least the second tributary comprises less than all segments of the host content.

10. A method for producing a marked content, comprising:
accessing, by a marking device, a first and at least a second tributary, the first tributary having been produced by embedding a first watermark symbol within an uncompressed version of the host content in at least a first watermark symbol interval and compressing at least the embedded portions of the host content thereafter according to a particular compression format, the first watermark symbol interval spanning an integer number of compression units of the particular compression algorithm;

selecting at least one segment from each of the first and the at least the second tributary based on a code, wherein each of the selected segments spans an integer number of compression units of the particular compression algorithm;

assembling the selected segments at the marking device, without decompressing the selected segments, to produce a marked content.

11. The method of claim 10, wherein the particular compression algorithm is selected from a group of compression algorithms consisting of: AAC, AACplus, MP3, JPEG, JPEG2000 and MPEG.

12. The method of claim 10, wherein the marked content is one of: a still image, a video content or an audio content.

13. The method of claim 10, wherein the first watermark interval corresponds to one or more of:
a duration of the host content in uncompressed format;
a spatial extent of the host content in uncompressed format;
a combination of spatial and temporal extent of the host content in uncompressed format; or
an extent of the host content in a frequency domain in uncompressed format.

14. The method of claim 10, wherein the second tributary is an unmarked version of the host content in compressed format.

15. The method of claim 10, wherein at least a portion of the second tributary comprises a second watermark symbol, the second tributary having been produced by embedding the second watermark symbol in the at least one watermark symbol interval within the uncompressed host content and compressing at least portions of the host content embedded with the second watermark symbol thereafter using the particular compression algorithm.

16. The method of claim 15, comprising accessing a third tributary, wherein at least a portion of the third tributary comprises a third watermark symbol, the third tributary having been produced by embedding the third watermark symbol in the at least one watermark symbol interval within the uncompressed host content and compressing at least portions of the host content embedded with the third watermark symbol thereafter using the particular compression algorithm.

17. The method of claim 10, wherein
the code comprises a sequence of logical values; and
selecting at least one segment from each of the first and at least the second tributaries comprises selecting a first segment from the first tributary to represent a first logical value within the sequence of logical values and selecting a second segment from the second tributary to represent a second logical value, different from the first logical value, within the sequence of logical values.

18. The method of claim 10, wherein one or more of the first tributary and the at least the second tributary comprises less than all segments of the host content.

19. A device, comprising:
an embedder configured to:
select a watermark interval for embedding watermark symbols within a host content, wherein the watermark symbol interval spans an integer multiple of compression units of a particular compression algorithm,
obtain at least a portion of the host content in uncompressed format, and
embed a first watermark symbol in at least one watermark symbol interval within the uncompressed host content;
a compressor configured to compress at least the portions of the host content embedded with the first watermark symbol to produce a first tributary; and a storage unit configured to store at least a portion of the first tributary and at least a portion of at least a second tributary.

20. The device of claim 19, wherein the compressor is configured to compress the host content using a compression algorithm selected from a group of compression algorithms consisting of: H.264, AAC, AACplus, MP3, JPEG, JPEG2000 and MPEG.

21. The device of claim 19, wherein the host content is one of: a still image, a video content or an audio content.

22. The device of claim 19, wherein the watermark symbol interval corresponds to one or more of:
   a duration of the host content in uncompressed format;
   a spatial extent of the host content in uncompressed format;
   a combination of spatial and temporal extent of the host content in uncompressed format; or
   an extent of the host content in a frequency domain in uncompressed format.

23. The device of claim 19, wherein the compressor is configured to produce the second tributary by compressing an unmarked version of the host content.

24. The device of claim 19, wherein embedder is configured to embed a second watermark symbol in the at least one watermark symbol interval within the uncompressed host content, and the compressor is configured to compress at least the portions of the host content embedded with the second watermark symbol to produce the second tributary.

25. The device of claim 24, wherein embedder is configured to embed a third watermark symbol in the at least one watermark symbol interval within the uncompressed host content, and the compressor is configured to compress at least the portions of the host content embedded with the third watermark symbol to produce the third tributary.

26. The device of claim 19, wherein one or more of the first tributary or the at least the second tributary comprises less than all segments of the host content.

27. A device, comprising:
   a multiplexer configured to access a first and at least a second tributary, the first tributary having been produced by embedding a first watermark symbol within an uncompressed version of the host content in at least a first watermark symbol interval and compressing at least the embedded portions of the host content thereafter according to a particular compression format, the first watermark symbol interval spanning an integer number of compression units of the particular compression algorithm; and
   a selector configured to select at least one segment from each of the first and at least the second tributaries based on a code, wherein each of the selected segments spans an integer number of compression units of the particular compression algorithm;
   the multiplexer further configured to assemble the selected segments, without decompressing the selected segments, to produce a marked content.

28. The device of claim 27, wherein the particular compression algorithm is selected from a group of compression algorithms consisting of: H.264, AAC, AACplus, MP3, JPEG, JPEG2000 and MPEG.

29. The device of claim 27, wherein the marked content is one of: a still image, a video content or an audio content.

30. The device of claim 27, wherein the first watermark interval corresponds to one or more of:
   a duration of the host content in uncompressed format;
   a spatial extent of the host content in uncompressed format;
   a combination of spatial and temporal extent of the host content in uncompressed format; or
   an extent of the host content in a frequency domain in uncompressed format.

31. The device of claim 27, wherein the second tributary is an unmarked version of the host content in compressed format.

32. The device of claim 27, wherein at least a portion of the second tributary comprises a second watermark symbol, the second tributary having been produced by embedding the second watermark symbol in the at least one watermark symbol interval within the uncompressed host content and compressing at least the portions of the host content embedded with the second watermark symbol thereafter using the particular compression algorithm.

33. The device of claim 32, wherein the multiplexer is configured to access a third tributary, wherein at least a portion of the third tributary comprises a third watermark symbol, the third tributary having been produced by embedding the third watermark symbol in the at least one watermark symbol interval within the uncompressed host content and compressing at least the portions of the host content embedded with the third watermark symbol thereafter using the particular compression algorithm.

34. The device of claim 27, wherein
   the code comprises a sequence of logical values; and
   the selector is configured to select a first segment from the first tributary to represent a first logical value within the sequence of logical values and selecting a second segment from the second tributary to represent a second logical value, different from the first logical value, within the sequence of logical values.

35. The device of claim 27, wherein one or more of the first tributary or the at least the second tributary comprises less than all segments of the host content.

36. A computer program product, embodied on a non-transitory computer readable medium, the computer program product comprising:
   computer code for selecting a watermark symbol interval for embedding watermark symbols within a host content, wherein the watermark symbol interval spans an integer multiple of compression units of a particular compression algorithm;
   computer code for obtaining at least a portion of the host content in uncompressed format;
   computer code for producing a first tributary by embedding a first watermark symbol in at least one watermark symbol interval within the uncompressed host content and compressing at least the embedded portions of the host content thereafter using the particular compression algorithm; and
   computer code for making the first tributary and at least a second tributary available to one of a content handling device or a computer readable storage medium.

37. A computer program product, embodied on a non-transitory computer readable medium, the computer program product comprising:
   computer code for accessing a first and at least a second tributary, the first tributary having been produced by embedding a first watermark symbol within an uncompressed version of the host content in at least a first watermark symbol interval and compressing at least the embedded portions of the host content thereafter according to a particular compression format, the first watermark symbol interval spanning an integer number of compression units of the particular compression algorithm;
   computer code for selecting at least one segment from each of the first and at least the second tributaries based on a code, wherein each of the selected segments spans an integer number of compression units of the particular compression algorithm; and computer code for assembling the selected segments at the marking device, without decompressing the selected segments, to produce a marked content.

* * * * *

UNITED STATES PATENT AND TRADEMARK OFFICE
CERTIFICATE OF CORRECTION

PATENT NO. : 8,681,978 B2  
APPLICATION NO. : 13/717449  
DATED : March 25, 2014  
INVENTOR(S) : Rade Petrovic et al.

Page 1 of 1

It is certified that error appears in the above-identified patent and that said Letters Patent is hereby corrected as shown below:

On The Title Page

In Item (12), under "United States Patent", in Column 1, Line 1, please delete "Petriovic" and insert -- Petrovic --, therefor.

In Item (72), under "Inventors", in Column 1, Line 1, please delete "Rade Petriovic," and insert -- Rade Petrovic, --, therefor.

In The Specification

In Column 10, Line 2, please delete "an detailed" and insert -- a detailed --, therefor.

In Column 13, Line 38, please delete "domain" and insert -- domain. --, therefor.

In The Claims

In Column 17, Line 41, in Claim 7, please delete "to the to" and insert -- to --, therefor.

Signed and Sealed this  
Twenty-ninth Day of March, 2016

Michelle K. Lee  
*Director of the United States Patent and Trademark Office*